US008646619B2

(12) United States Patent
Winig et al.

(10) Patent No.: US 8,646,619 B2
(45) **Date of Patent: *Feb. 11, 2014**

(54) EYEWEAR DISPLAY SYSTEM

(75) Inventors: Alan Winig, Wynnewood, PA (US); Richard Winig, Villanova, PA (US); James Eldon, Barto, PA (US)

(73) Assignee: Eye Designs, LLC, Collegevile, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/441,527

(22) Filed: Apr. 6, 2012

(65) Prior Publication Data

US 2012/0187055 A1 Jul. 26, 2012

Related U.S. Application Data

(60) Continuation of application No. 13/249,488, filed on Sep. 30, 2011, now Pat. No. 8,235,223, and a division of application No. 12/420,293, filed on Apr. 8, 2009, now Pat. No. 8,127,946.

(60) Provisional application No. 61/043,431, filed on Apr. 9, 2008.

(51) Int. Cl.

| | |
|---|---|
| ***E05B 73/00*** | (2006.01) |
| *A47F 7/02* | (2006.01) |
| *A47H 1/00* | (2006.01) |
| *F16M 13/00* | (2006.01) |
| *E05B 65/00* | (2006.01) |
| *E05B 69/00* | (2006.01) |

(52) U.S. Cl.

USPC ................ 211/7; 211/85.1; 211/95; 248/553; 70/57.1; 70/58

(58) Field of Classification Search

USPC ............. 211/4, 7, 8, 85.9, 57.1, 59.1, 106.01, 211/100, 193, 95, 163, 144, 131.1, 115; 248/551, 902, 553; 206/806, 5, 6; 70/14, 57.1, 58–62; 40/642.01

See application file for complete search history.

(56) References Cited

U.S. PATENT DOCUMENTS

| | | | | | |
|---|---|---|---|---|---|
| 2,430,985 | A | * | 11/1947 | King | 24/573.11 |
| 2,619,026 | A | * | 11/1952 | Scott | 99/393 |
| 2,913,952 | A | * | 11/1959 | Becker | 411/61 |
| 3,220,078 | A | * | 11/1965 | Preziosi | 411/349 |
| 4,805,781 | A | * | 2/1989 | Tegel | 211/85.1 |
| 5,018,253 | A | * | 5/1991 | Oppenheimer | 24/458 |
| 5,025,931 | A | * | 6/1991 | Berger | 211/85.1 |
| 5,056,668 | A | * | 10/1991 | Berger | 211/85.1 |
| 5,069,416 | A | * | 12/1991 | Ennis | 248/231.81 |
| 5,085,388 | A | * | 2/1992 | Creutz | 248/288.31 |
| 5,144,820 | A | * | 9/1992 | Holmgren | 70/57.1 |
| 5,148,690 | A | * | 9/1992 | Wang | 70/38 A |

(Continued)

*Primary Examiner* — Joshua J Michener
*Assistant Examiner* — Devin Barnett
(74) *Attorney, Agent, or Firm* — Duane Morris LLP

(57) ABSTRACT

The present invention provides a lockable eyewear display system. One embodiment of the system includes a support frame on which the eyewear is placed, a lock that secures the eyewear to the frame, and a key that removes the lock from the frame. The device may further include an anchor connected to the frame that anchors the frame to a fixture or display object such as a rack or furniture. In another embodiment, the eyewear display device includes an articulating joint allowing at least a portion of the support frame to be swiveled.

24 Claims, 22 Drawing Sheets

(56) References Cited

U.S. PATENT DOCUMENTS

| | | | | | |
|---|---|---|---|---|---|
| 5,178,283 | A | * | 1/1993 | Ennis | 211/4 |
| D374,366 | S | * | 10/1996 | Eldon et al. | D6/567 |
| 5,593,045 | A | * | 1/1997 | Eldon et al. | 211/85.1 |
| 5,676,258 | A | * | 10/1997 | Leyden et al. | 211/7 |
| 5,819,957 | A | * | 10/1998 | Hahn | 211/85.1 |
| D406,714 | S | * | 3/1999 | Eldon et al. | D6/567 |
| 5,931,315 | A | * | 8/1999 | Lorentz et al. | 211/40 |
| 6,182,840 | B1 | * | 2/2001 | Tegel | 211/85.1 |
| 6,205,824 | B1 | * | 3/2001 | Miao | 70/58 |
| 6,209,835 | B1 | * | 4/2001 | Walrath et al. | 248/276.1 |
| 6,364,124 | B1 | * | 4/2002 | Chen | 211/4 |
| 6,393,877 | B1 | * | 5/2002 | Church | 70/62 |
| 6,695,270 | B1 | * | 2/2004 | Smed | 248/274.1 |
| 6,817,477 | B2 | * | 11/2004 | McMurray et al. | 211/4 |
| 6,957,555 | B1 | * | 10/2005 | Nagel et al. | 70/57.1 |
| 7,134,559 | B2 | * | 11/2006 | Zoueki | 211/85.1 |
| 7,269,983 | B1 | * | 9/2007 | Mchatet et al. | 70/14 |
| 7,270,241 | B2 | * | 9/2007 | Nobili | 211/85.1 |
| 7,420,731 | B2 | * | 9/2008 | Piontkowski | 359/382 |
| D579,705 | S | * | 11/2008 | Winig et al. | D6/567 |
| D587,934 | S | * | 3/2009 | Winig et al. | D6/449 |
| 2004/0026344 | A1 | * | 2/2004 | Sedon et al. | 211/7 |
| 2004/0084386 | A1 | * | 5/2004 | Huehner et al. | 211/4 |
| 2004/0200790 | A1 | * | 10/2004 | Zoueki | 211/85.1 |
| 2005/0253034 | A1 | * | 11/2005 | Bally et al. | 248/276.1 |
| 2009/0014604 | A1 | * | 1/2009 | Pintur | 248/158 |

* cited by examiner

EYEWEAR DISPLAY SYSTEM

CROSS-REFERENCE TO RELATED APPLICATIONS

This application is a continuation application of U.S. application Ser. No. 13/249,488, filed on Sep. 30, 2011, now issued as U.S. Pat. No. 8,235,223, the entirety of which application is incorporated herein by reference, which itself is a divisional application of U.S. application Ser. No. 12/420,293, filed on Apr. 8, 2009, now issued as U.S. Pat. No. 8,127,946, all of which claim the priority to U.S. Provisional Application Ser. No. 61/043,431, filed on Apr. 9, 2008.

FIELD OF THE INVENTION

The present invention relates to the field of product display devices, and more particularly to eyewear displays that aid in deterring theft and articulating displays.

BACKGROUND OF THE INVENTION

Retail displays are critical to the sales of consumer products as they are the means by which products are positioned in the view and reach of prospective purchasers. Product displays are therefore configured to hold and position as much product as possible in the view of consumers in an orderly and appealing arrangement. To this end, a great variety of product display racks and product support devices have been contrived for all types of products. As the number of different types of displays multiplies, greater amounts of store space is occupied to the extent that not all displays can be on the sales floor at the same time. For seasonal items such as sunglasses, display racks are moved about a store throughout the year, according to demand and sales results. In many stores, seasonal display racks are placed in storage during the off-season. In large stores, this can lead to permanent misplacement of some display racks and the inventory carried thereon. In the retail sale of expensive articles, it is usually important that each article be displayed in such a way that it appears attractive. This is particularly true in the case of eyewear, whether they be corrective glasses or sunglasses, since there are a large number of styles to put on display at the same time. Despite the large number of frames or complete glasses, it is still important that the prospective buyer be able to examine each item from all sides and, by displaying the merchandise properly, he or she may be able to do so without handling the item. The handling of a pair of sunglasses can cause it to be smeared with finger prints and these not only show on the surface of the glasses, but they also collect dust.

In the optical business, it is desirable to display a large variety of eyeglasses and eyeglass frames in a manner that is attractive and allows the prospective buyer easily to examine and compare a large number of different frames or eyeglasses. Advantageously, the frames or eyeglasses are supported such that they are readily seen from different perspectives. The supporting structure should not unduly interfere with the view of the frames or eyeglasses, and should make it easy for the customer to try them on, with minimal danger of upsetting other frames. A wide variety of such displays are known.

Eyeglasses and/or frames have a peculiar structure, namely that needed to fit in place on the wearer's head. Thus, the frames have temple pieces or earpieces to engage over a wearer's ears pivotally coupled to a lens support that typically has spaced pads to fit the bridge of the nose. These aspects are common to frames without lenses, sample frames with plain glass lenses, finished eyeglasses, sunglasses, reading glasses, goggles and the like, and the present invention is applicable to all these types, as well as other articles having similar needs or attributes.

It may be desirable to display frames with the temple pieces or earpieces folded wholly or partly closed against the lens frame, or alternatively, folded fully open to the position they occupy in use. The fixtures supporting the frames should preferably be amenable to one or more of such display alternatives, and should also be arranged to hold the frames in an attractive array. Potential purchasers typically make their selection of eyeglass frames very carefully, and an attractive but unobtrusive supporting fixture is important. While the eyeglass and eyeglass frame displays disclosed in the foregoing patents include a variety of different types of display structures, it would still be desirable to improve on the supporting structures to provide a display system that is more sturdy, light weight, simple but versatile, unobtrusive, attractive, inexpensive and easy to install. It would further be desirable to provide a security system for eyeglasses or eyeglass frames when displayed on supporting structures that secures the frames to the supporting structures such that the frames cannot be casually upset, for example when reaching for an adjacent frame in a compact array.

As the quality of the frames and/or lens inserts have increased, likewise so have their prices, making the ready to wear devices prime subject matter for thieves. To reduce the amount of pilferage, shop owners have taken to the procedure of displaying their eyeglasses in glass enclosed, locked cases. This approach not only greatly increases the overhead, but also presents a requirement that a salesperson be readily available to service the display to allow a prospective customer to look at and try on a designer set of eyeglasses. Providers that sell eyewear often carry product lines offered by designer labels. Designer eyewear tends to be relatively expensive. Most eyewear is relatively small, and easy to pocket or carry away discretely. Making eyewear products, especially large selections of expensive products, accessible to customers and passersby presents problems such as theft, loss, accidental displacement, and breakage. Such problems constitute a significant expense to providers.

Some attempts to overcome security problems include keeping model eyewear in glass display counters and locked display cases. Each counter or case typically holds multiple pairs of model eyewear. Such display systems require personnel to open, remove, and replace model eyewear each time a customer wants to see a product up close. Several shortcomings are present in these systems. Display cases present a barrier between the customer and the product. This barrier prevents the customer from seeing the product up close or viewing the product from different angles. Glass display cases create glares that further obscure a customer's view of the products within. Also, glass counters and countertop display cases are heavy and difficult to move, or are permanently affixed to a floor or wall. The limited mobility of display cases prevents providers from rearranging the displays, or increasing and decreasing the display space to accommodate the provider's changing inventory.

Other attempts to overcome security problems include connecting model eyewear to a weight or fixture using cables or chains. Such devices allow customers to handle the model eyewear, view them up close, and try them on without the assistance of personnel. The cable or chain connecting the model eyewear to the weight or fixture prevents a customer from stealing or carrying the eyewear away. Shortcomings are present in these systems as well. The cables or chains connected to the model eyewear can break or become tangled from customer handling. Tangled cables and chains prevent customers from fully accessing the model eyewear and make the display space look cluttered and disorganized. Cables or chains attached to eyewear also interfere with the customer's ability to wear the eyewear comfortably, and are sometimes removed by personnel to allow a customer to try on a product.

Another attempt to overcome security problems is shown in U.S. Pat. No. 5,593,045, which provides a removable security cable 45 having a lockable retainer portion on one end that slips over an eyewear display fixture 15 to lock the nose bridge of a pair of eyeglasses on the fixture. As shown in FIGS. 11-20 in this patent, the retainer portion 45 includes a rotary lock pin 54 that is rotatable by a user such that in alternating positions the retainer portion is either trapped on or freely removable from the fixture 15 to unlock the eyeglasses. The lock pin 54, however, may simply be engaged and rotated by an ordinary conventional slotted screwdriver or similar object by an unauthorized user which provides less than optimum security required in some situations.

Still other attempts to overcome security problems include affixing magnetic tags or Radio Frequency ID tags to the model eyewear. A magnetic or RFID tag is attached to each pair of model eyewear, and is used in conjunction with large detectors located at the entrances and exits of a store. Such systems allow customers to handle and try on model eyewear, but prevent customers from taking the eyewear out of the store. Some shortcomings associated with these systems are that magnets and RFID tags are bulky, and interfere with the customer's ability to try on the eyewear. Bulky tags are also awkward looking, and do not prevent eyewear from falling off of display racks or being misplaced within the store.

There exists a need for a display system that allows customers to see eyewear frames up close, has an aesthetically pleasing appearance, is free from bulky or awkward parts, provides a secure display platform, deters theft, and can be removed and re-secured by personnel quickly, easily, and repeatedly to allow customers to fully access model eyewear in a controlled manner.

SUMMARY OF THE INVENTION

The present invention relates to an eyewear display system, which in some embodiments may include a plurality of eyewear display assembles. In one embodiment, the eyewear display system includes a support frame, a removable lock engageable with the frame, and a specially-configured key operable to disengage the lock from the frame. The present invention also relates to a method of securely displaying eyewear. The steps of the method include placing eyewear on a support frame, attaching a lock to the support frame, and removing the eyewear from the support frame by removing the lock from the support frame with a key. The present invention also relates to an eyewear display kit. The kit includes an eyewear support frame, a lock attachable to the support frame, and a key operable to remove the lock from the support frame.

In one embodiment, the support frame has an anchor, a longitudinally-extending spine protruding from the anchor, a pair of resiliently movable locking members such as cantilever beams extending from the spine in one embodiment, a pair of arms extending outwardly in opposite directions from the spine for supporting the eyewear, and a tower extending outwardly from the spine. The cantilever beams may terminate in flanges configured and adapted to releasably engage complementary locking surfaces on the lock. In one embodiment, the locking surfaces may be disposed inside the lock which may include an axial central passageway. The arms preferably extend outwards from the spine at a location between the anchor and the cantilever beams to support a temple or earpiece of a pair of eyeglass support frames. The tower may extend from the spine at a location between the arm and the prongs. In one embodiment, the tower defines an opening configured for receiving a portion of the lock therethrough. In one embodiment, the spine may have an elongated curved s-shape. The support frame may further include a card holder. In one embodiment, the anchor includes a plate connected to the spine. The plate may define a pilot hole for receiving a mounting fastener for attaching the anchor and eyewear display assembly to a display object. In some embodiments, the anchor also includes at least two spaced-apart flexible tabs that may be engaged and expanded by the fastener. The tabs are each connected to the plate by a corresponding side panel in some embodiments.

The lock includes a barrel and a lockbar in one embodiment. The lockbar extends outwardly from the barrel and is configured to be received in the opening of the tower for securing eyeglass support frames to the support frame. In one embodiment, the lockbar defines an angled portion. The barrel preferably defines a ridge extending into an axially-extending central passageway extending through the barrel. The barrel further defines an eyehole intersecting central passageway in some embodiments for receiving a portion of the key therethrough. In one embodiment, the barrel has two opposing ridges and defines two eyeholes on opposite sides of the barrel.

The key includes a pair of user-operated flexible cantilevers arranged in opposing relationship to each other. In one embodiment, the key may also have a shaft protruding from between the pair of cantilevers. The shaft supports a guide or pilot at one end for engaging the lock to align the key with the lock. The pair of cantilevers has a pair of finger grips for grasping by a user. The cantilevers are configured to engage the cantilever beams of the support frame when the lock is applied to the support frame. In one embodiment, each cantilever on the key also defines a peg that extends inwardly in opposing relationship to the another peg defined on the opposite one of the cantilevers for engaging the cantilever beams of the support frame. In one embodiment, the lock includes an eyehole formed in opposite sides of the lock that is sized and configured to receive the pegs therethrough for accessing the cantilever beams of the support frame through the lock.

A method of using the lock generally includes applying the lock to the support frame by inserting the cantilever beams into the central passageway of the barrel and essentially simultaneously inserting the lockbar into the opening of the tower. The flanges on the cantilever beams engage the ridges in the lock to immobilize and secure the lock to the support frame. The key may be used to release the lock by engaging the cantilever beams through the eyeholes in the lock and disengaging the flanges from the ridges, wherein the lock may be axially removed from the support frame.

DETAILED DESCRIPTION OF PREFERRED EMBODIMENTS

Figure 1:
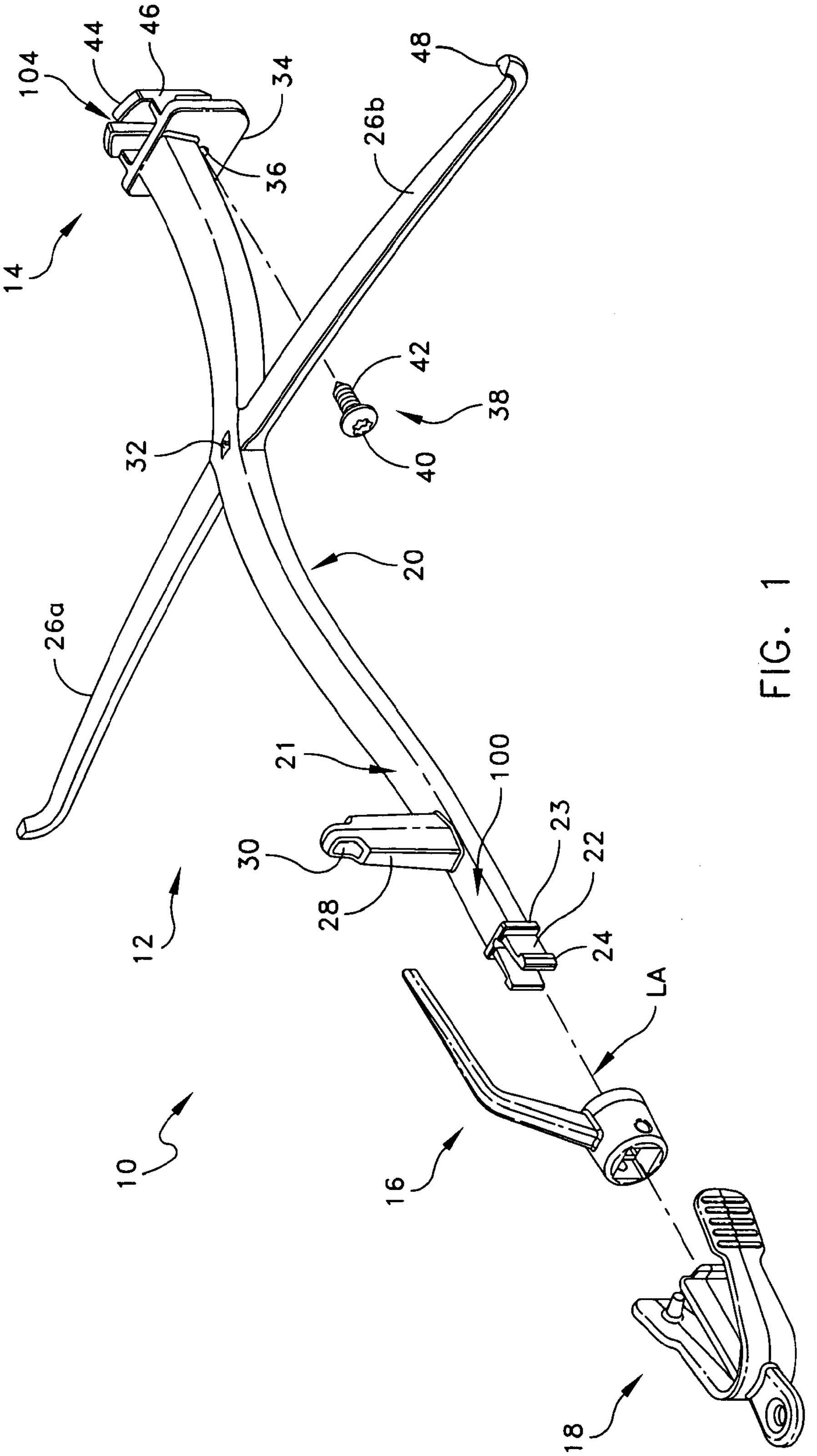
FIG. 1 is an exploded perspective view of a display assembly according to the present invention.

This description of preferred embodiments is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness. In the description, relative terms such as "horizontal," "vertical," "up," "down," "top" and "bottom" as well as derivatives thereof (e.g., "horizontally," "downwardly," "upwardly," "rearwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. In the claims, means-plus-function clauses, if used, are intended to cover the structures described, suggested, or rendered obvious by the written description or drawings for performing the recited function, including not only structural equivalents but also equivalent structures.

As the terms are used herein, "eyewear," "eyeglasses," and "eyeglass frames" shall be broadly construed and may be used interchangeably to mean any type of conventional eyeglasses or eyeglass frames, with or without lenses inserted in the frames.

Figure 15:
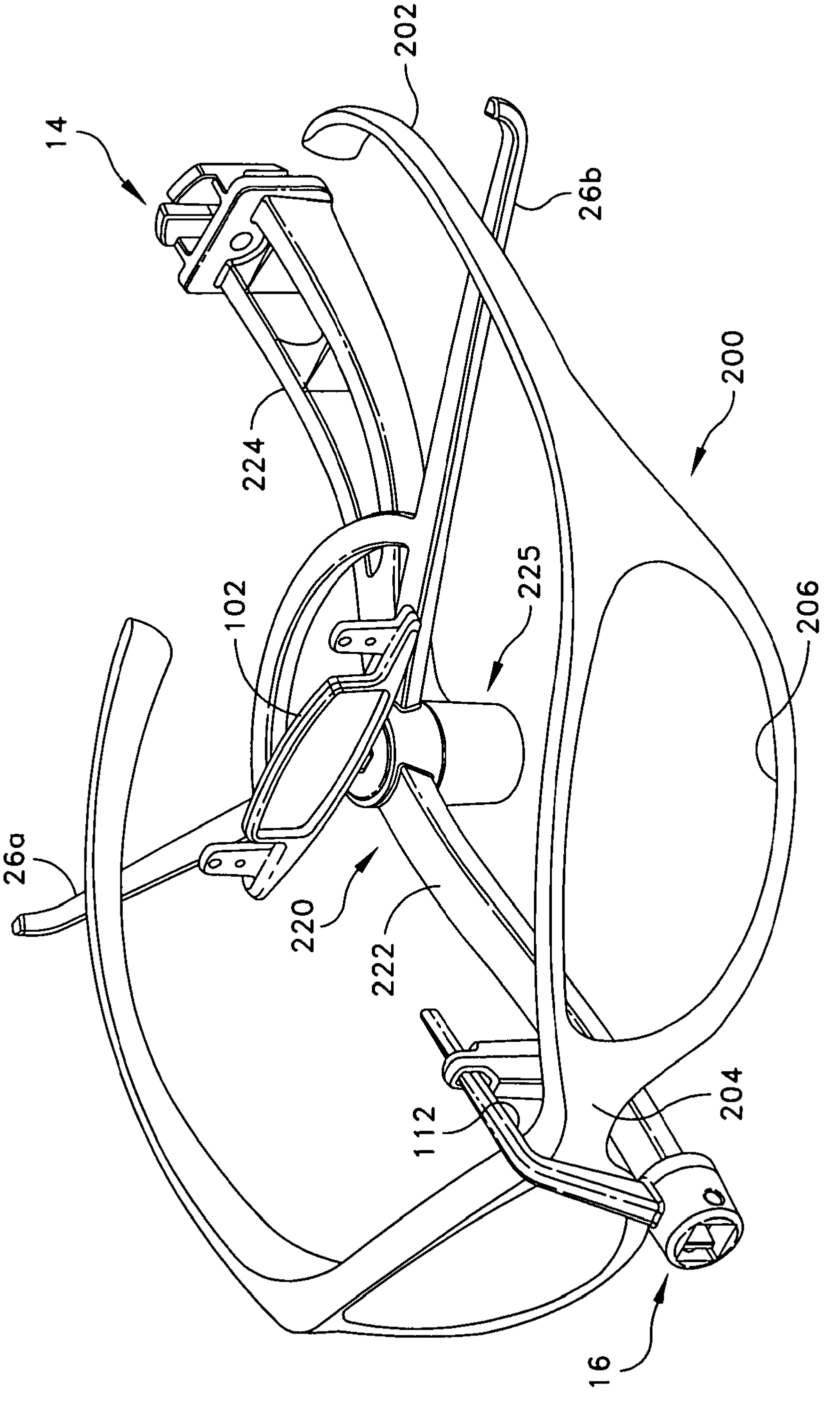
FIG. 15 is a perspective view of the fully assembled second embodiment of the display assembly shown with the lock installed and a pair of eyeglass frames secured in the display assembly.

Referring to FIG. 1, one embodiment of an eyewear display assembly 10 includes a support frame 12 having an anchor 14 attachable to a display object, a removably lock 16, and a key 18. Support frame 12 has a longitudinally-extending spine 20 that projects outwardly from anchor 14. Spine 20 may be curved upwardly so as to form an elongated S-shape in some embodiments. In one embodiment, spine 20 terminates with a pair of spaced-apart confronting locking members such as cantilever beams 22 formed on a free end of the spine. Preferably, cantilever beams 22 are flexible and resiliently disposed on spine 20 such that the beams are (1) compressible and movable inwards towards each other to an unlocked position and (2) expandable and movable outwards away from each other to a locked position. Each cantilever beam 22 respectively includes a wedge-shaped flange 24 located on an outer surface of its free end (see also FIG. 13). Wedge-shaped flanges 24 each have an inclined surface forming a ramp 25 and a shoulder defining a locking surface 27 disposed generally perpendicular to the longitudinal axis LA of spine 20. A tower 28 projects outwardly from a top surface 21 of spine 20, which in some embodiments may be in a generally vertical direction normal to spine 20 and arms 26*a* and 26*b*. Tower 28 may be located on spine 20 between the cantilever beams 22 and arms 26*a* and 26*b*. A through-bore or opening 30 is defined at a top end of tower 28 that preferably is arranged in substantially parallel relation to spine 20. The distance from opening 30 to the top surface 21 of spine 20 is preferably greater than the thickness or height of the nose bridge of a typical pair of eyeglass frames. In one embodiment, a portion of top surface 21 of spine 20 defines a generally horizontal supporting surface 100 which may be between tower 28 and cantilever beams 22 for supporting the nose bridge 204 of a pair of eyeglass frames 200, as shown in FIG. 15.

Figure 13:
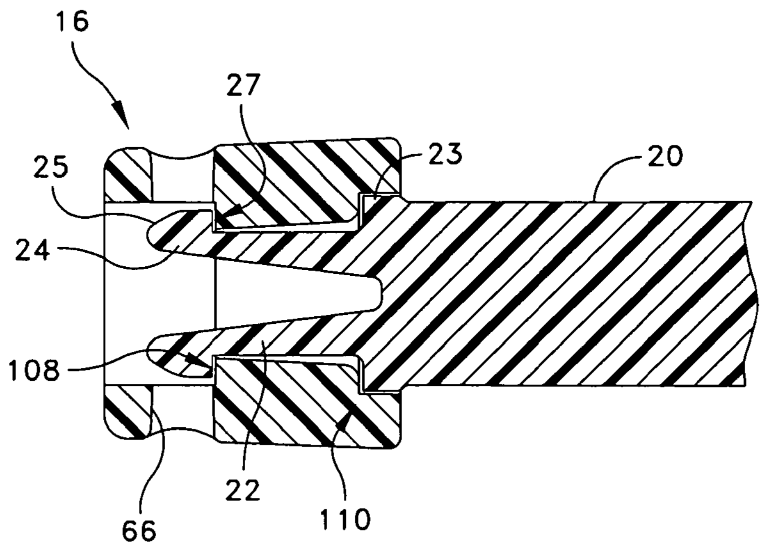
FIG. 13 is a cross sectional view taken of a portion of the lock shown in FIG. 12, taken along plane 13-13.

In one embodiment, spine 20 may include a through-bore 32 is defined in spine 20, which may be in close proximity to the intersection of arms 26*a* and 26*b* with spine 20 as shown in FIG. 1. A portion of a display card or price tag holder 102, or similar component to that shown in FIG. 7 configured to be received in through-bore 32, may be positioned within through-bore 32 so as to be disposed between tower 28 and anchor 14 in one embodiment. As shown in FIGS. 1 and 13, spine 20 may further include an enlarged boss 23 in some embodiments that engages a mutually configured shoulder portion 110 of lock 16 to limit the insertion depth of spline 20 into lock 16.

Figure 6:
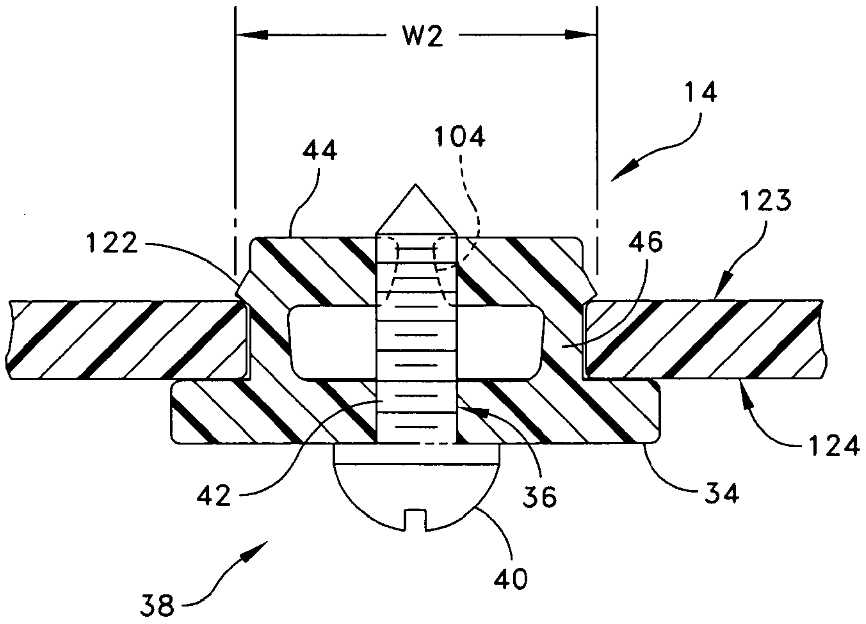
FIG. 6 is a top cross sectional view of an anchor of one embodiment of the display assembly shown in FIG. 5, taken along plane 6-6 and engaged with the display object.

Referring to FIGS. 1 and 6, anchor 14 in one embodiment includes a plate 34 that defines a pilot hole 36 that is sized to receive a fastener, such as without limitation screw 38 having head 40 and tapered shaft 42 (see FIG. 6). In one embodiment, plate 34 is preferably connected to at least two tabs 44 by respective side panels 46. Panels 46 may be arranged in spaced apart relationship to each other and oriented generally perpendicular to plate 34 and tabs 44. Tabs 44 may be spaced apart to define a gap 104 configured and adapted to receive a portion of shaft 42 of screw 38 therethrough, as further described herein. Gap 104 provides flexibility to tabs 44 such that the tabs may be compressed or expanded in relation to each other under an applied force, and will spring back to their original configuration and spacing when the force is removed.

With continuing reference to FIG. 1, support frame 12 also preferably includes a first arm **26*a* and a second arm 26*b*, each extending outwardly from spine 20 for supporting the ear pieces 202 of eyeglass frames 200. In one embodiment of the invention, arms 26*a* and 26*b* extend generally outwards from and transverse to a central portion of spine 20 at substantially right angles with respect to the spine 20. In other embodiments of the invention, arms 26*a* and 26*b* may be swept back toward anchor 14, or alternatively swept forward toward cantilever beams 22, at an angle to spine 20. In one embodiment, arms 26*a* and 26*b* may be swept back or forward at a representative angle without limitation to spine 20 at about twenty-five to sixty degrees. Also, the distance that each arm 26*a* and 26*b* extend outwards from spine 20 is preferably longer than about one half of the width of typical eyeglass frames 200 to rest the ear pieces 202 of the eyeglass frame thereon, as shown in FIG. 15. In some embodiments, a flare or upward bend may be formed at end 48 of each arm 26*a* and 26*b* to confine movement of the ear pieces 202** when positioned on the arms.

Figure 2:
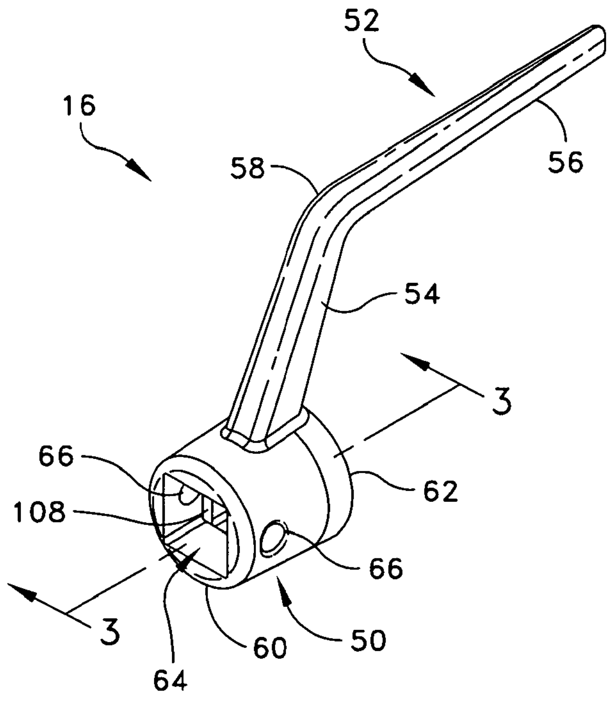
FIG. 2 is a perspective view of a lock of one embodiment of the display assembly.
Figure 3:
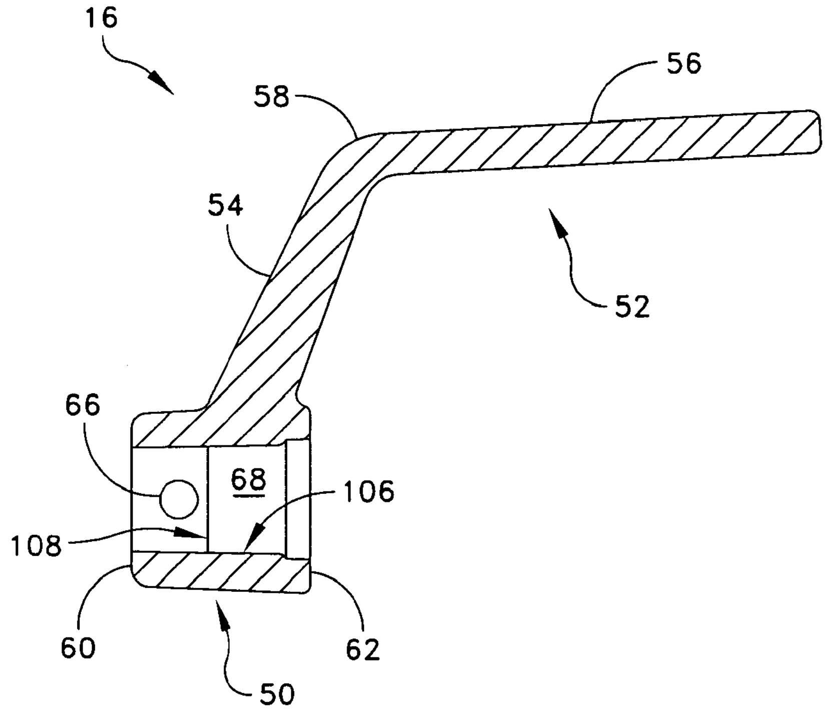
FIG. 3 is a cross sectional view of the lock shown in FIG. 2, taken along plane 3-3.

Referring to FIGS. 2 and 3, lock 16 includes a barrel 50 and a lockbar 52 that projects outwardly from an outer surface of barrel 50. Lockbar 52 has a proximal portion 54 that projects outwardly and upwardly from the outer surface of barrel 50 in a generally vertical direction, and a distal portion 56 that projects rearwardly and generally horizontally from a bend 58 that preferably is defined between them. Proximal portion 54 may be slightly angled rearwards with respect to barrel 50 in some embodiments as best shown in FIG. 3. Proximal portion 54 projects upwards from the outer surface of barrel 50 so as to define a height that is approximately equivalent to or slightly less than the height of opening 30 defined at the top end of tower 28 on spine 20.

Referring to FIGS. 2 and 3, barrel 50 has a key-receiving end 60 and a flange-receiving end 62, and defines an axial central passageway 64 that extends longitudinally through barrel 50 and communicates with both key-receiving end 60 and opposite flange-receiving end 62. In some other embodiments, central passageway 64 may extend only partially through barrel 50. Passageway 64 preferably is sized so as to receive cantilever beams 22 through flange-receiving end 62. Central passageway 64 defines an inner surface 106, which is preferably configured to engage wedge-shaped flanges 24 for locking barrel 50 onto spine 20 as further described herein. In a preferred embodiment, central passageway 64 has a square or rectangular cross-sectional shape as best shown in FIG. 2. Although the exterior surface of barrel 50 is preferably cylindrical, other cross-sectional profiles may be provided for functional and aesthetic reasons such as rectangular, oval, polygonal, hexagonal, octagonal, etc. Barrel 50 also defines at least one laterally-extending eyehole 66 that extends from the side of the outer surface of barrel 50 inwards so as to communicate with central passageway 64. In one embodiment, at least two eyeholes 66 are provided through the sides of barrel 50 and are preferably disposed in confronting coaxial relation to one another in barrel 50 as shown. A pair of raised portions or ridges 68 are located on opposite sides of inner surface 106 of barrel 50 that form a portion of central passageway 64 and project into central passageway 64 in confronting spaced apart relation to one another. Ridges 68 each define a locking surface 108 disposed generally perpendicular to a longitudinal axis extending axially through barrel 50 and inner surface 106. In one embodiment, locking surfaces 108 may be disposed adjacent to eyehole 66; however, other suitable locations may be used for the locking surfaces. As best shown in FIG. 13, ridges 68 are preferably spaced apart from each other by a distance such that the width of at least a portion of central passageway 64 between ridges 68 is slightly less than the normal undeflected width of cantilever beams 22 at wedge-shaped flanges 24. This ensures that cantilever beams 22 are securely engaged against ridges 68 when the beams are fully inserted and seated in lock 16.

Figure 4:
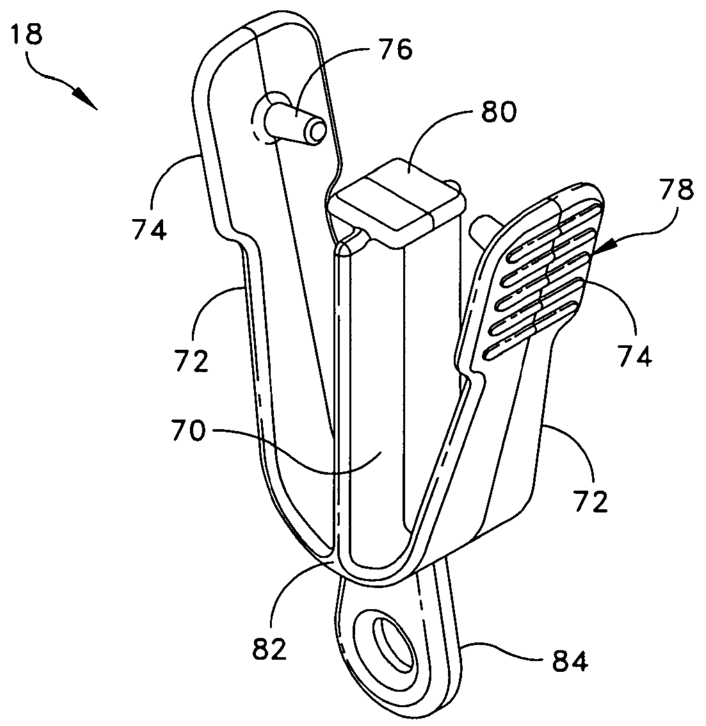
FIG. 4 is a perspective view of a key of one embodiment of the display assembly.

Referring to FIG. 4, key 18 may include a shaft 70 protruding outwards from and disposed between a pair of divergently spaced-apart operating extensions such as cantilevers 72. Cantilevers 72 are preferably flexible or resilient and formed on opposite sides of key 18 such that the cantilevers are compressible or movable inwards towards each other by squeezing key 18 and expandable or movable outwards away from each other by releasing inward pressure on the cantilevers. Cantilevers 72 form a generally U-shaped key 18 in one embodiment as shown. Cantilevers 72 may each have a finger grip pad 74 formed adjacent to its free end. Each grip pad 74 may have a textured surface 78 facing outwardly and away from shaft 70 for grasping by a user's fingers. Shaft 70 projects outwardly from a base 82 formed between cantilevers 72, and terminates at a free end located between finger grip pads 74 so as to define a guide or pilot 80. In one embodiment as shown, shaft 70 may have a generally rectangular cross-section. In other embodiments, shaft 70 may have other cross-sectional shapes or may be omitted entirely. Key 18 may include an eyelet 84 projecting outwardly from base 82 and away from shaft 70. Eyelet 84 may be attached to a lanyard or keychain (not shown) fastened to the eyelet.

Figure 21:
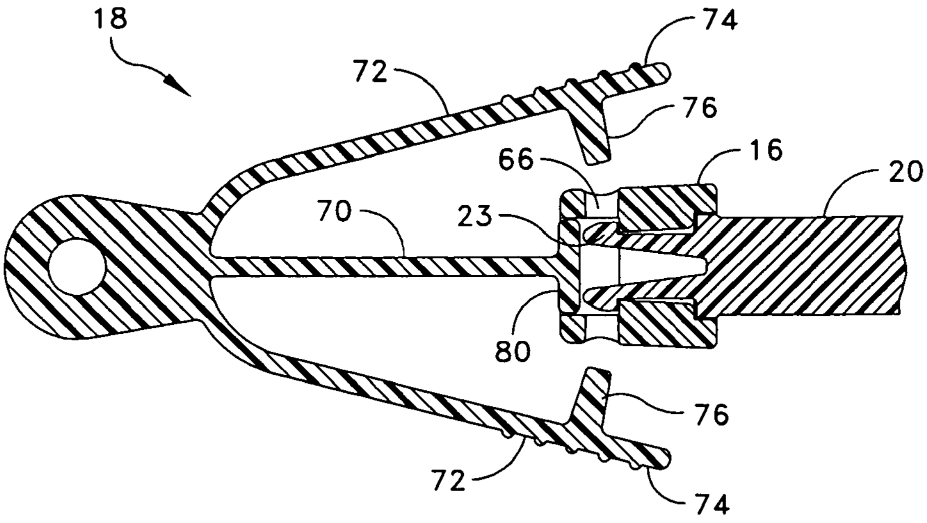
FIGS. 21-23 show sequential top cross-sectional views of the interaction between the key and lock during the process of removing the lock from the second embodiment of the display assembly.
Figure 22:
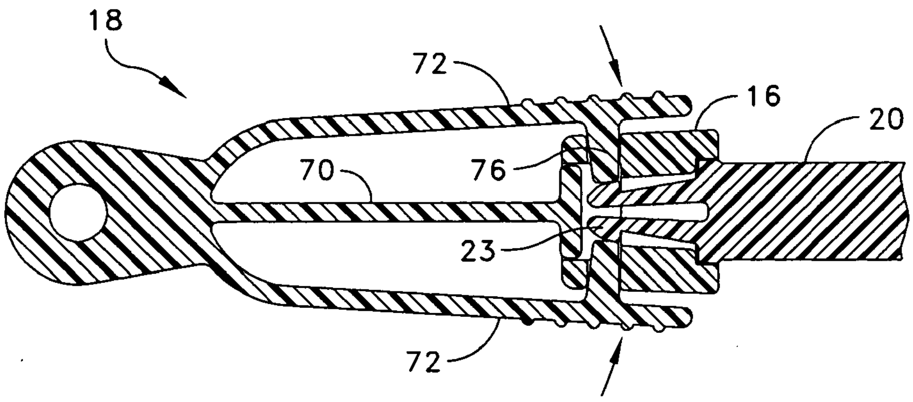
Figure 23:
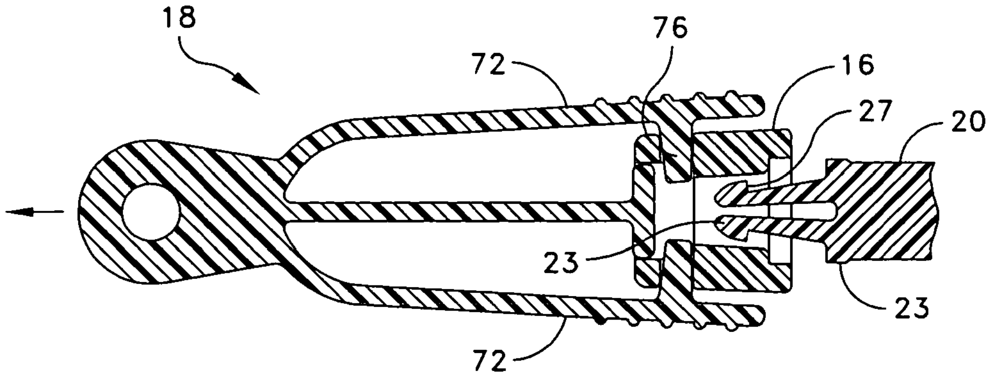

With continuing reference to FIG. 4, each cantilever 72 of key 18 further includes a releasing protrusion such as peg 76 or a similar member projecting inwardly from an inner surface of each grip pad 74 in a general direction towards each other and shaft 70. Accordingly, in one embodiment, pegs 76 are arranged in opposing relationship to each other such that the pegs are movable inwards and outwards towards each other by alternatingly squeezing and releasing cantilevers 72 by a user. The relative lengths of shaft 70 and cantilevers 72 are preferably such that pegs 76 are located on inner surfaces of pads 74 proximate to the free ends of cantilevers 72 at a point beyond the length of shaft 70 so that inward movement of the pegs will not be obstructed by the shaft, as best shown in FIGS. 21-23. Preferably, shaft 70 and pegs 76 are arranged and oriented in cooperation with the placement of eyeholes 66 in barrel 50 of lock 16 such that the pegs are transversely aligned with the eyeholes when pilot 80 engages or abuts key-receiving end 60 of lock 16. This advantageously eliminates or reduces the need for the store personal to carefully align each peg 76 with a corresponding eyehole 66, thereby simplifying and speeding up the peg and eyehole alignment process.

It will be appreciated that although pegs 76 on key 18 and eyeholes 66 in lock 16 may be generally circular or round in shape as shown, other suitable shaped pegs and eyeholes may be used so long as eyeholes 66 are configured to receive pegs 76 therethrough for engaging cantilevers 22 of spine 20 when lock 16 is seated on spine 20. Accordingly, the invention is not limited by the shape of the pegs and eyeholes.

Support frame 12 and lock 16 are preferably formed of a semi-rigid and flexible material such as a polymer in some embodiments, as are cantilever beams 22 such that cantilever beams 22 may be deflected or biased inwardly by engagement with lock 16. Preferably, the material selected for cantilever beams 22 is elastically deformable such that the beams may be deflected but will automatically return towards their undeflected original conformation. In other embodiments, support frame 12 and/or lock 16 may be made of a rigid, inelastic material so long as at least cantilever beams 22 are made of a flexible and resilient material for reasons further described herein. Key 18 is also preferably formed of a semi-rigid and flexible material such as a polymer material in some embodiments such that cantilevers 72 may similarly be deflected or biased inwardly toward each other and shaft 70 by a user. In other embodiments, key 18 may be made of a rigid, inelastic material so long as at least cantilevers 72 are made of a flexible and resilient material for reasons further described herein. In one embodiment, support frame 12, lock 16, and key 18 may be formed from an injection molded polymer such as a polycarbonate polymer such as Lexan™ plastic available from SABIC (Saudi Basic Industries Corp.) of Saudi Arabia. It will be appreciated, however, that other suitable polymers or non-polymeric materials may be used for these components provided that at least cantilever beams 22 and cantilevers 72 are formed of a resilient material that may be deflected or biased. In some embodiments, a combination of rigid materials and semi-rigid resilient materials may be variously used for key 18, lock 16, and support frame 12 so long as cantilever beams 22 and cantilevers 72 are formed of a resilient material.

A method of assembling and operating eyewear display assembly 10 to securely display eyewear will now be described with initial reference to FIG. 1.

Figure 14:
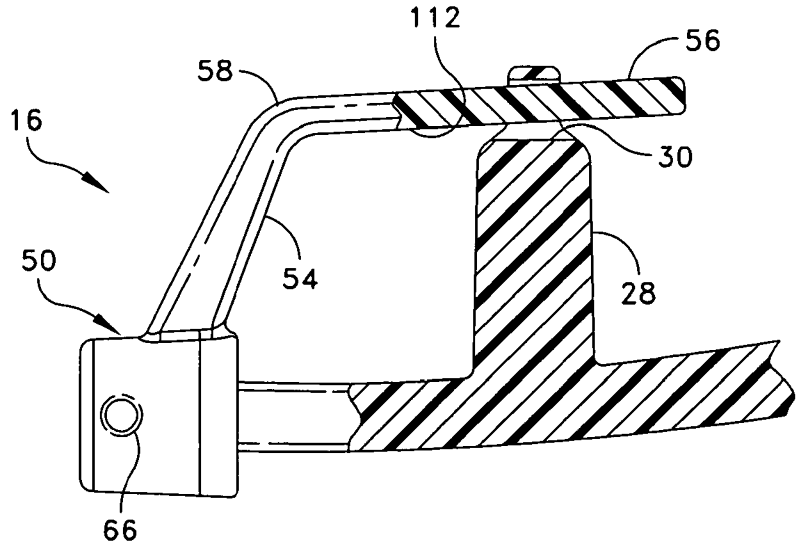
FIG. 14 is a cross sectional view of a portion of the lock and tower shown in FIG. 12, taken along plane 14-14.

Lock 16 is first aligned with and then assembled to the support frame 12 by inserting the cantilever beams 22 into the flange-receiving end 62 of the lock, and essentially simultaneously inserting the distal portion 56 of the lockbar 52 into the opening 30 of the tower 28. Lock 16 is applied or attached to the frame by pushing the cantilever beams 22 through central passageway 64 in the direction of the key-receiving end 60, and simultaneously pushing the lockbar 52 through the opening 30. The ridges 68 of lock 16 engage the tapered flanges 24 of the cantilever beams 22, causing the cantilever beams to deflect and be temporarily compressed and forced inwards towards each other as the cantilever beams 22 advance through central passageway 64. The cantilever beams 22 advance through central passageway 64 until the flanges 24 clear the ridges 68 towards end 60 of lock 16. When the flanges 24 clear the ridges 68, the cantilever beams 22 return to their uncompressed normal conformation due to the resilience of the cantilever beams that causes the flanges and cantilever beams to expand outwards and diverge. Locking surfaces 108 formed by ridges 68 of lock 16 become mutually engaged with locking surfaces 27 of cantilever beams 22, thereby locking lock 16 to support shaft 12 such that the lock cannot be removed from shaft by an unauthorized consumer. The lock 16 and the support frame 12 are now in a locked configuration, as shown in FIGS. 13 and 14. Distal portion 56 of the lockbar 52 is inserted into the opening 30 of the tower 28 such that the nose bridge 204 of a pair of eyeglass frames 200 are trapped between the lockbar 52 and spine 20. An axial force applied to pull lock 16 forward without extreme pressure that might otherwise damage support frame 12 will not disengage the lock from cantilever beams 22, thus securing the eyeglass frames 200 as shown in FIG. 15 between the lock and support frame.

In the locked configuration shown in FIGS. 13 and 14, the enlarged boss 23 formed on each cantilever beam 22 engages the shoulder portion 110 lock 16 limiting the insertion depth of the flanges 24 and cantilever beams 22 in central passageway 64 of the lock. The dimensions of the support frame 12 at the enlarged boss 23 location where the spine 20 meets the cantilever beams 22 are thus such that the spine 20 cannot advance through central passageway 64 past the ridges 68. This prevents the cantilever beams 22 from moving too far through central passageway 64 towards the key-receiving end 60 to ensure that the lockbar 52 remains inserted through opening 30 in tower 28 such that the eyeglass frames 200 cannot be removed without employing key 18. In other embodiments, central passageway 64 may not extend completely through the key-receiving end 60, thereby limiting the insertion depth of the flanges 24 and cantilever beams 22. In the locked configuration, the cantilever beams 22 and flanges 24 are preferably dimensioned and configured with ridges 68 of lock 16 such that the cantilever beams 22 cannot move a significant distance through central passageway 64 in either a rearward or forward direction (see FIG. 13). The barrel 50 of lock 16 is substantially immobilized around the cantilever beams 22, confining the lockbar 52 within the opening 30 of the tower 28. The spine 20, lock 16 with barrel 50 and lockbar 52, and tower 28 together form a selectively openable and closeable loop 112 as shown in FIG. 15. The diameter of the closed loop 112 may vary, but the diameter or size of the loop opening at every point along or around the perimeter of the closed loop is preferably smaller than the diameter at every point along the lens support portion 206 of the eyeglass frame 200. This traps nose piece 204 of eyeglass frames 200 in the closed loop 112 and prevents the eyewear frame from being removed laterally through the loop to defeat the lock 16. Accordingly, in one embodiment, loop 112 is movable between a closed position in which eyeglass frames 200 cannot be removed from the loop and an open position in which eyeglass frames 200 may be freely removed from the loop.

Figure 19:
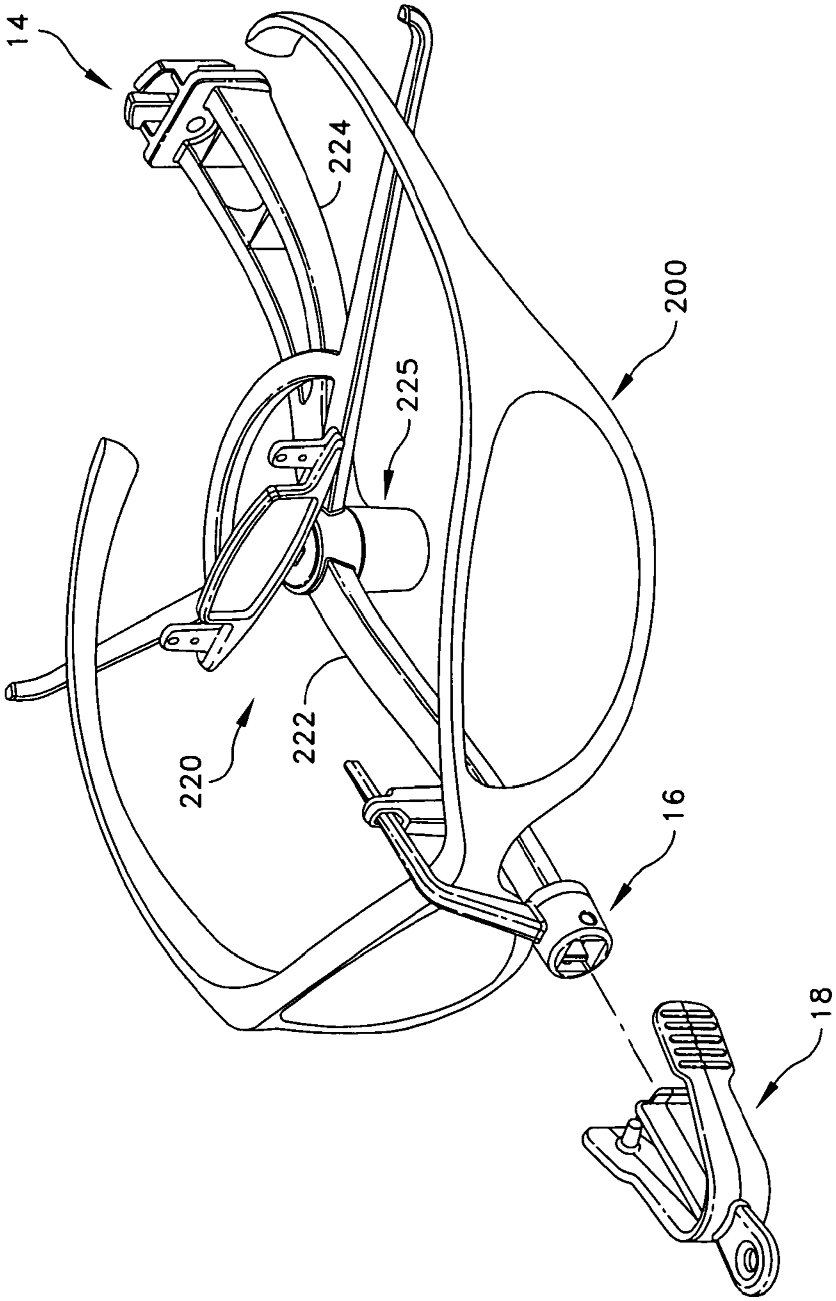
FIG. 19 is a perspective view of the fully assembled second embodiment of the display assembly shown with the lock installed and a pair of eyeglass frames secured in the display assembly, and the key aligned with the lock.
Figure 20:
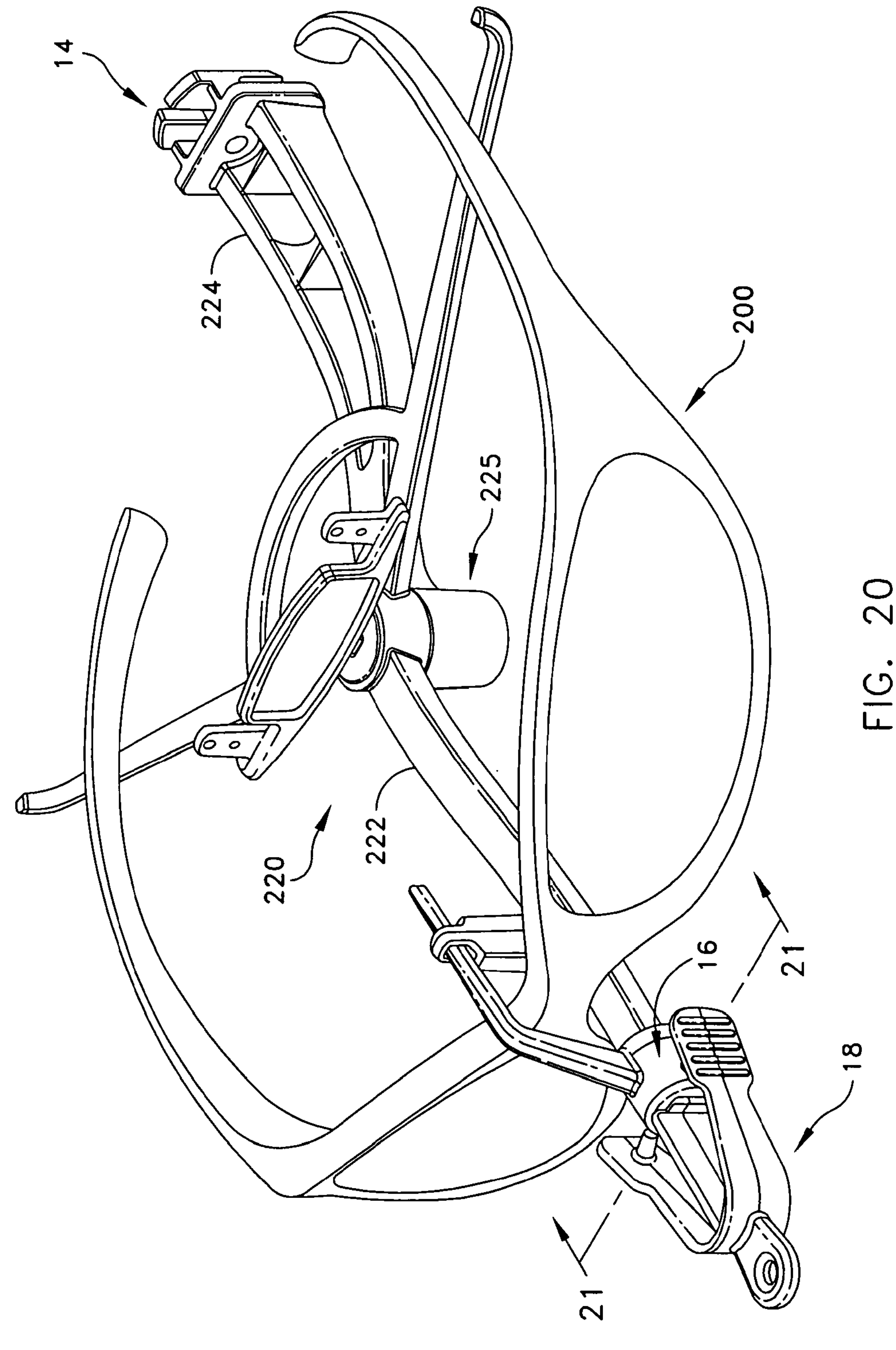
FIG. 20 is a perspective view of the fully assembled second embodiment of the display assembly shown with the lock installed and a pair of eyeglass frames secured in the display assembly, and the key engaged with the lock.
Figure 24:
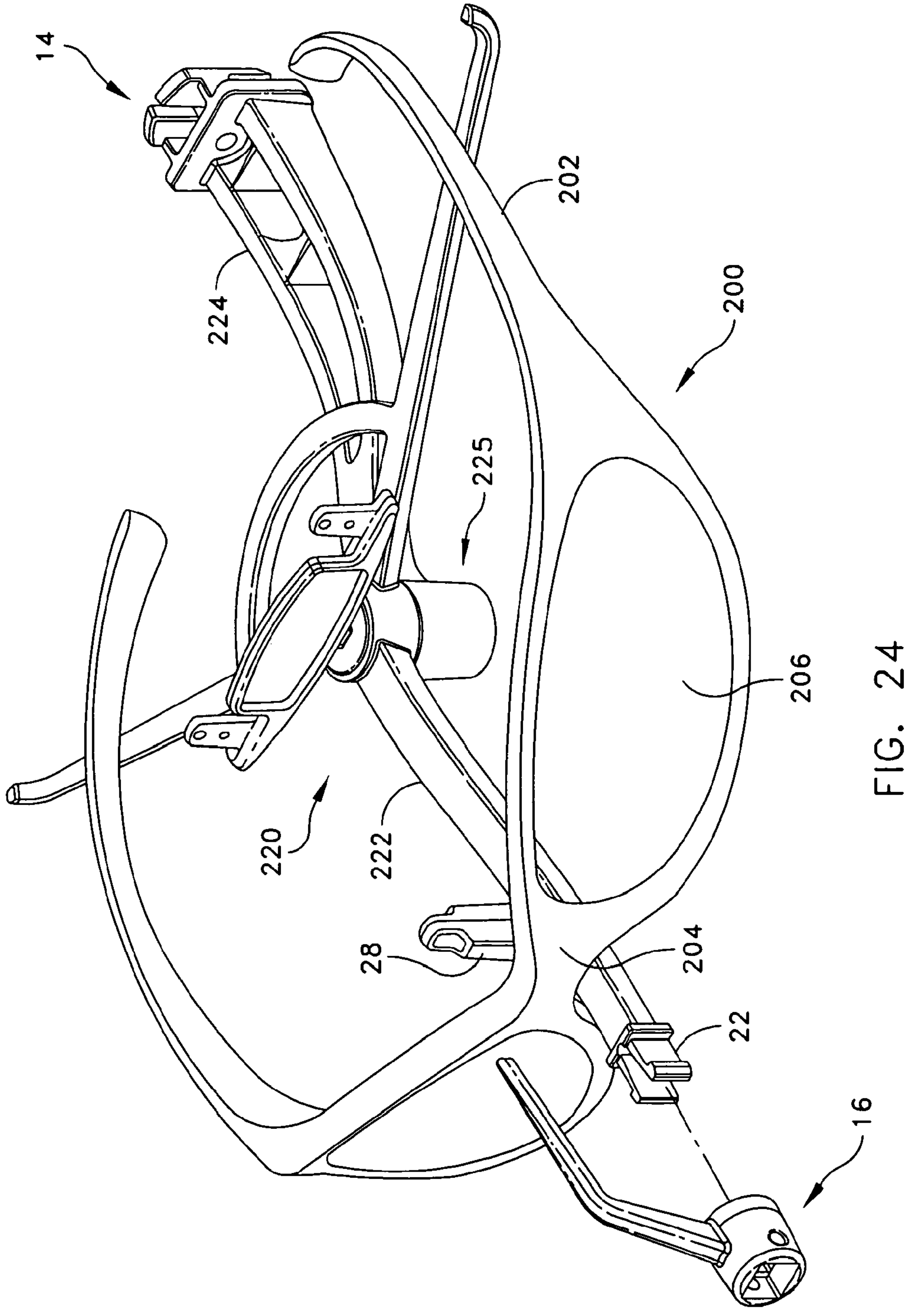
FIG. 24 is a perspective view of the fully assembled second embodiment of the display assembly shown with the lock removed from the display assembly and a pair of eyeglass frames openly supported in the display assembly.

To release the lock 16 from the support frame 12, a user selectively engages the cantilever beams 22 with the cantilevers 72 of the key 18. Reference is made to FIGS. 19-24. In one embodiment, a user holds the key 18 by the finger grip pads 74 between the fingers, and aligns the guide or pilot 80 of the key 18 with the key-receiving end 60 of the barrel 50 as shown in FIG. 19. The user then inserts and/or abuts the pilot 80 of key 18 against lock 16 as shown in FIGS. 20 and 21. Preferably, key 18 is mutually configured and dimensioned with lock 16 such that pegs 76 of the key are each aligned with a corresponding eyehole 66 in lock 16. As shown by the directional arrows in FIG. 22, the user next then squeezes cantilevers 72 of key 18 together which applies inward force on both cantilevers 72, causing the cantilevers 72 to move inwards towards each other in the direction of the shaft 70. As the cantilevers 72 move towards the shaft 70, the pegs 76 on key 18 enter the eyeholes 66 of the barrel 50. The pegs 76 move through the eyeholes 66 and preferably engage the cantilever beams 22 on spine 20, and more preferably in some embodiments engage flanges 24 of the beams 22. The user applies sufficient force to cantilevers 72 so that pegs 76 displace the cantilever beams 22 towards each other within central passageway 64, until the flanges 24 clear the ridges 68 as shown in FIG. 22. This disengages locking surfaces 108 of lock 16 from corresponding locking surfaces 27 of flanges 24. As shown in FIG. 23, the user then pulls the barrel 50 in a forward axial direction away from the spine 20 (as shown by the directional arrow) while maintaining the inward force on the cantilevers 72 of key 18, thereby removing the lock 16 from the support frame 12 as shown in FIG. 24. Lockbar 52 of lock 16 is concurrently disengaged from opening 30 of tower 28 to free the eyeglass frames 200 and allow the store personnel to remove the eyeglass frames from support frame 12 for inspection by the consumer.

Figure 5:
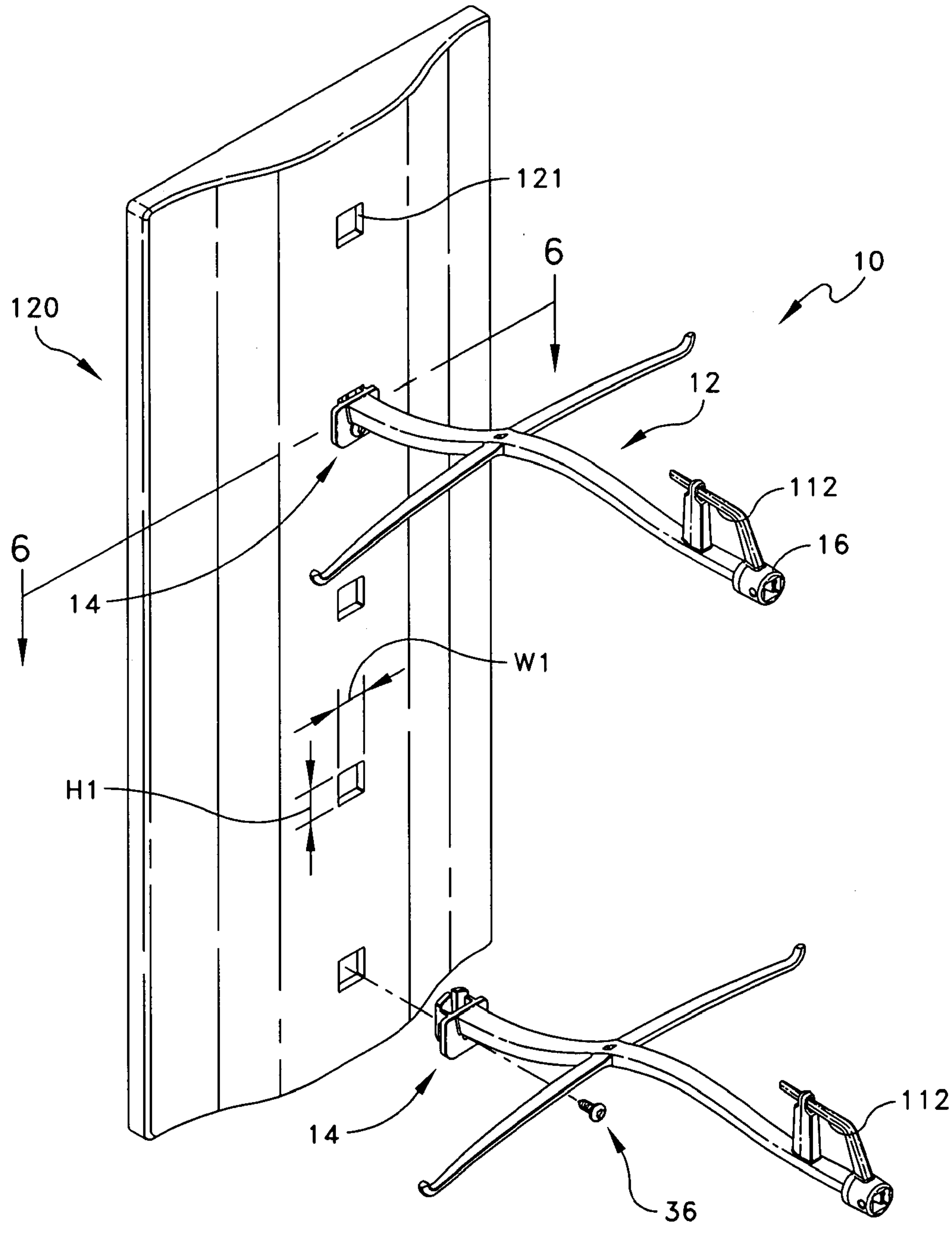
FIG. 5 is a perspective view of display assemblies shown mounted in and unmounted to a display object.

In use, one or more frames 12 may be anchored to a display object 120 such as the one shown in FIG. 5. The frames 12 are preferably anchored to a substantially vertical surface on the display object. In one embodiment, display object 120 may be columnar in shape; however, numerous other possible shapes. Accordingly, such display objects 120 may include furniture and fixtures such as without limitation racks, cabinets, counters, walls, easels, columns, and boards. The support frame 12 is anchored to the display object 120 by anchor 14. The anchor 14 is preferably applied to the display object such that the support frame 12 is oriented with the tower 28 extending generally upwards and vertically.

In one possible embodiment of the anchor 14 without tabs 44 and panels 46 (not shown), plate 34 of anchor 14 is simply positioned flush against the vertical surface of the display object 120. The screw 38 is inserted through the pilot hole 36 of anchor 14 and embedded into the display object 120, securing the support frame 12 to the display object.

In another possible embodiment, as shown in FIGS. 5 and 6, anchor 14 is provided with plate 34 having a pair of tabs 44 connected to the plate by a pair of space part side panels 46. Display object 120 may correspondingly define a plurality of portals 121 for receiving a portion of anchor 14 therethrough, including tabs 44 and panels 46 in some embodiments. The display object 120 preferably has a portal 121 extending completely therethrough, at the location where the support frame 12 is to be anchored. The part of the display object 120 to which the support frame 12 will be anchored preferably has a thickness that is less than the depth of the panels 46 so that at least a portion of the panels 46 may project rearwards from the display object when support frame 12 is inserted through portal 121. The dimensions of the portal 121 defined by width W1 and height H1 are preferably smaller than the dimensions of the plate 34. In one embodiment, width W1 of portal 121 may be smaller than the maximum width W2 of anchor 14 measured from the outside of one panel 46 to the other panel so that the panels and tabs 44 attached thereto may be inserted through the portal and secured therein as shown in FIG. 6. In some embodiments, panels 46 may have protrusions 122 that increase the width W2 of the panels at one location on each panel. Protrusions 122 are preferably arranged on panels 46 such that the protrusions will emerge from portal 121 on the side of display object 120 opposite plate 34 when support frame 12 is fully inserted in portal 121, and more preferably protrusion 122 will engage a rear surface 124 to further secure the frame to the display object.

To anchor the support frame 12, the tabs 44 and panels 46 are inserted through the portal 121 on one side of the display object 120 at an angle with respect to the direction such as width W1 in which the portal is smaller than the width W2 of the panels. The panels 46 and tabs 44 are temporarily compressed or flexed inwards towards each other and advance through the portal 121 until the tabs 44 and protrusions 122 emerge from the portal on rear surface 124 of the display object 120. The support frame 12 is then straightened by a user until at least a portion of the plate 34 and at least a portion of the tabs 44 are positioned approximately parallel and flush with opposite front and rear surfaces 124 and 123, respectively, of the display object 120. Panels 46 and tabs 44 expand and return to their original configuration. The panels 46 remain positioned within the portal 121 engaging the sides of the portal while protrusions 122 engage rear surface 123 of display object 120 as shown in FIG. 6 to secure support frame 12 to the display object. Although support frame 12 is already secured in portal 121 of display object 120, screw 38 may optionally be inserted through the pilot hole 36 and between tabs 44 into gap 104 to further secure the frame to the display object and prevent unauthorized removal of the frame. As the screw 38 is rotated by the user and advances axially between the tabs 44, the widening cross sections of the screw 38 engage and gradually force the tabs 44 to move apart, expanding panels 46 of anchor 14 to further engage side surfaces of portal 121. The expansion of the anchor in and around the portal 14 immobilizes the anchor 14 in the portal, further securing the support frame 12 to the display object 120.

In one embodiment of the screw 38, the head 40 preferably defines a slot configuration that that receives a tool other than a standard flathead or Phillip's screwdriver. In one embodiment, the slot configuration may be a star-shaped slot that is operated by a torx head screwdriver. Other suitable and secure conventional special-shaped slots and corresponding tools may be used. The requirement for a specialized or uncommon tool to insert and remove the screw 38 from display object 120 provides an added theft deterrent, because the support frame 12 is not otherwise removable from the display object 120 without damaging these components unless screw 38 is first removed.

In use, eyeglass frames 200 are placed on each of the one or more frames 12 anchored to the display object 120. In a preferred embodiment, the ear pieces 202 of the eyeglass frames 200 rest on the arms 26*a* and 26*b*. The nose bridge 204 of the eyeglass frames 200 rests on the supporting surface 100 of the spine 20 between the tower 28 and the cantilever beams 22, such that one of the lens support portions 206 of the eyeglass frame is disposed on either side of the spine. Once the eyeglass frames 200 is properly positioned on the support frame 12, the lock 16 may be applied to the support frame 12 in the manner described herein. When the lock 16 and support frame 12 are in the locked configuration, as shown in FIGS. 13 and 14, the nose bridge 204 of the eyeglass frames 200 sits in the closed loop 112 formed by the spine 20, barrel 50, lockbar 52, and tower 28. The size of the closed loop 112 prevents the lens support portions 206 of eyeglass frames 200 from passing through the closed loop, which prevents the eyewear from being removed from the support frame 12.

To remove the eyeglass frames 200 from support frame 12, key 12 is used to remove the lock 16 from the support frame 12 in the manner described herein which opens loop 112. The lock 16 and the key 18 may be held by store personnel while the eyeglass frames are handled by a consumer.

An advantage of the present invention is that locking eyeglass frames on a support frame 12 and anchoring the support frame 12 to a display object allows providers to display the eyewear without the risk of customers and passersby taking the eyewear off of the frames 12 and carrying it away. Securing eyewear to display objects avoids the need for glass display cases, and allows eyewear to be displayed where customers can see the eyewear up close. The eyewear display assembly 10 of the present invention further has an aesthetically pleasing appearance. The eyewear display assembly 10 further is free from bulky or awkward parts, and free from cumbersome chains or cables. The lock 16 can be removed with the key 18 and re-applied by personnel quickly, easily, and repeatedly to allow customers to fully access displayed eyewear in a controlled and efficient manner.

Another advantage of the present invention is that the eyewear display assemblies 10 are lightweight and can be anchored to display objects that are portable. Portable display objects can be rearranged, added, or removed from a display room to accommodate the provider's changing inventory. The eyewear display assemblies 10 can be removed from the display objects by removing the screw 38. Individual assemblies 10 can be rearranged on the display object or removed and stored for later use.

According to another embodiment, a support frame 220 is provided that allows at least a portion of the frame to be swiveled or articulated with respect to another portion of the frame and anchor 14. Referring to FIGS. 8-12, an articulating support frame 220 includes a longitudinally-extending stationary spine 224 coupled to anchor 14 and a longitudinally-extending movable spine 222. In one embodiment, movable spine 22 is preferably supported by stationary spine 224 and movable with respect to the stationary spine. In one embodiment, stationary spine 224 is rigidly coupled to anchor 14 so there is no relative movement between the stationary spine and the anchor. Anchor 14, lock 16, and key 18 may generally be similar in configuration and arrangement as described elsewhere herein, and function in a similar manner.

Figure 9:
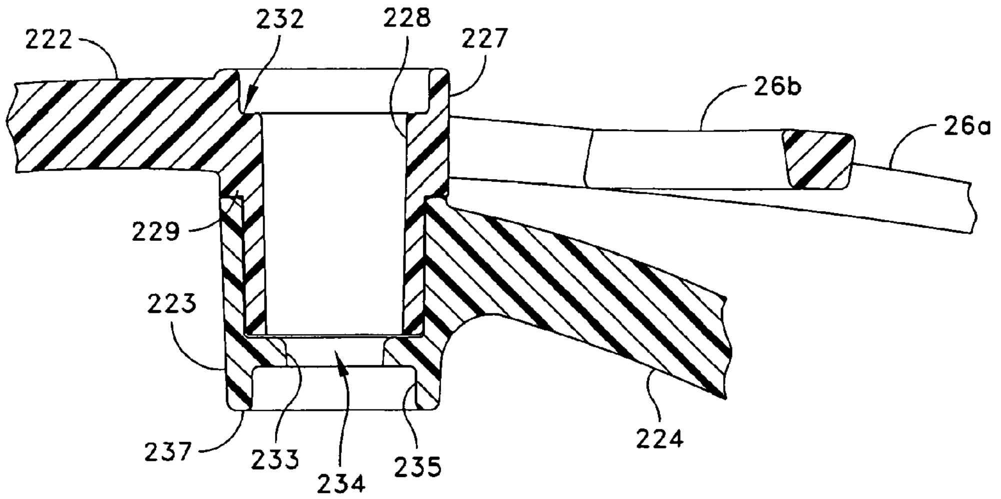
FIG. 9 is a cross sectional view of the articulating joint shown in FIG. 8, taken along plane 9-9.
Figure 10:
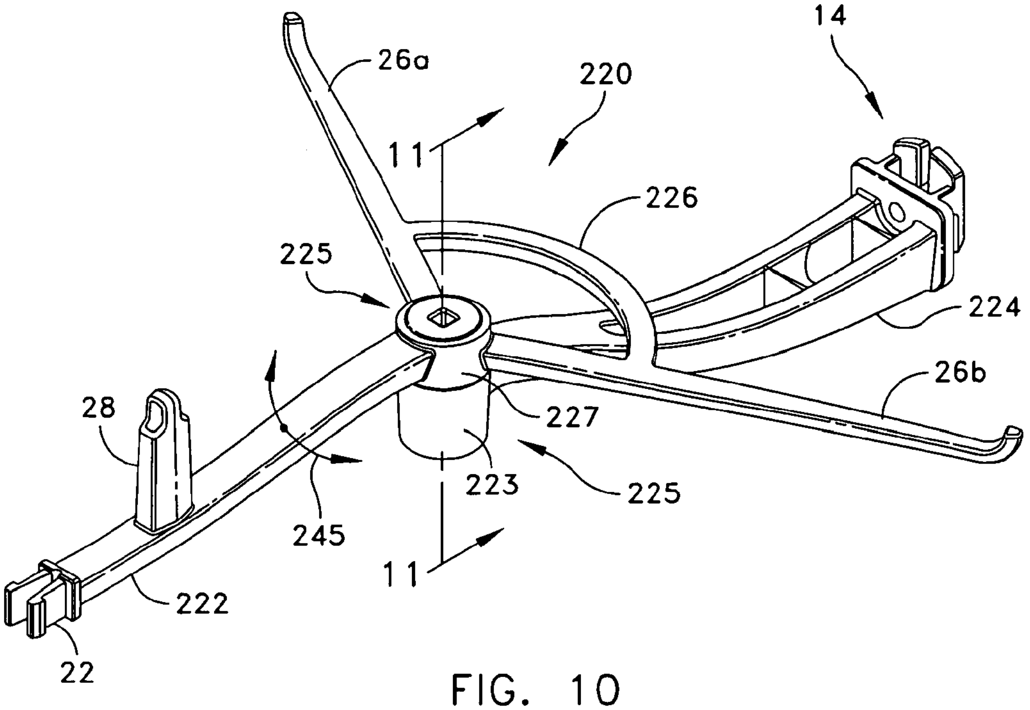
FIG. 10 is a perspective view of the fully assembled second embodiment of the display assembly.

Stationary spine 224 and movable spine 222 are rotatably coupled together by an articulating joint 225, as shown in FIG. 10. In one embodiment, joint 225 allows movable spine 222 to be rotated arcuately with respect to stationary spine 224. Referring to FIGS. 7-12, articulating joint 225 is formed by collar 223, sleeve 227, and pin 229 which may be assembled together as illustrated and further described herein. Joint 225 defines an axis of rotation Ar (see FIG. 11) that is generally perpendicular to the length of stationary and movable spines 224 and 222, respectively. Accordingly, in one possible embodiment as shown, movable spine 222 is pivotable about a vertical axis of rotation Ar through a generally horizontal plane defined perpendicular to the axis of rotation. This embodiment allows the movable spine 222 to be swiveled in two directions for displaying eyeglass frames 200 to consumers and allowing consumers to inspect different portions of the frames.

Figure 7:
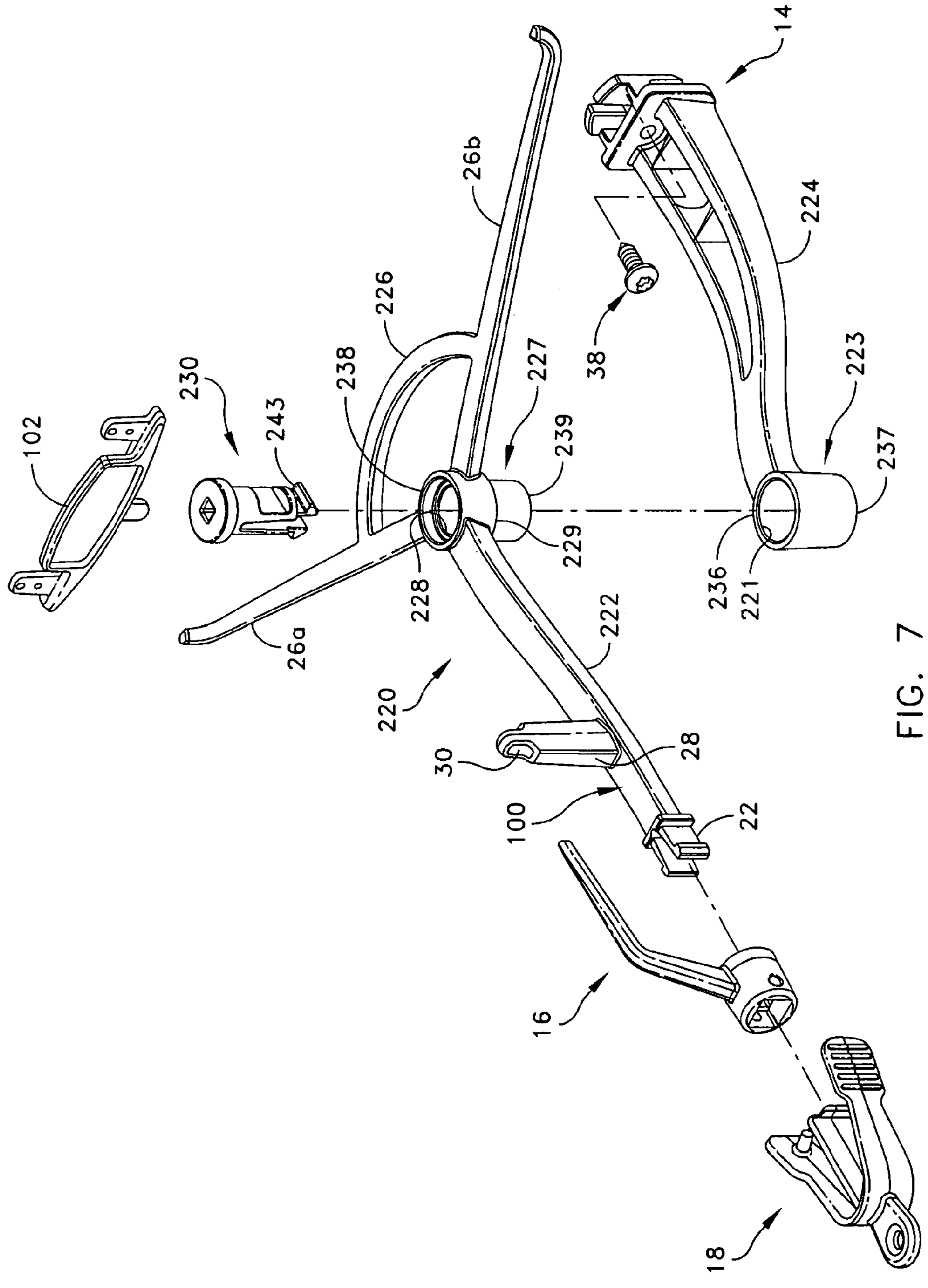
FIG. 7 is an exploded perspective view of a second embodiment of display assembly having an articulating joint.
Figure 8:
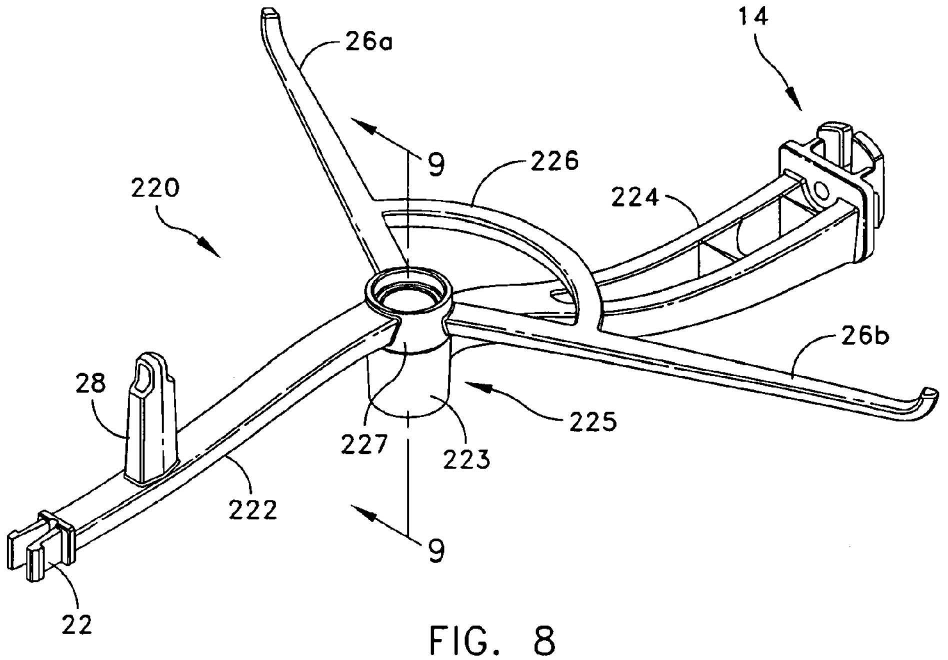
FIG. 8 is a perspective view of the partially assembled second embodiment of the display assembly.
Figure 11:
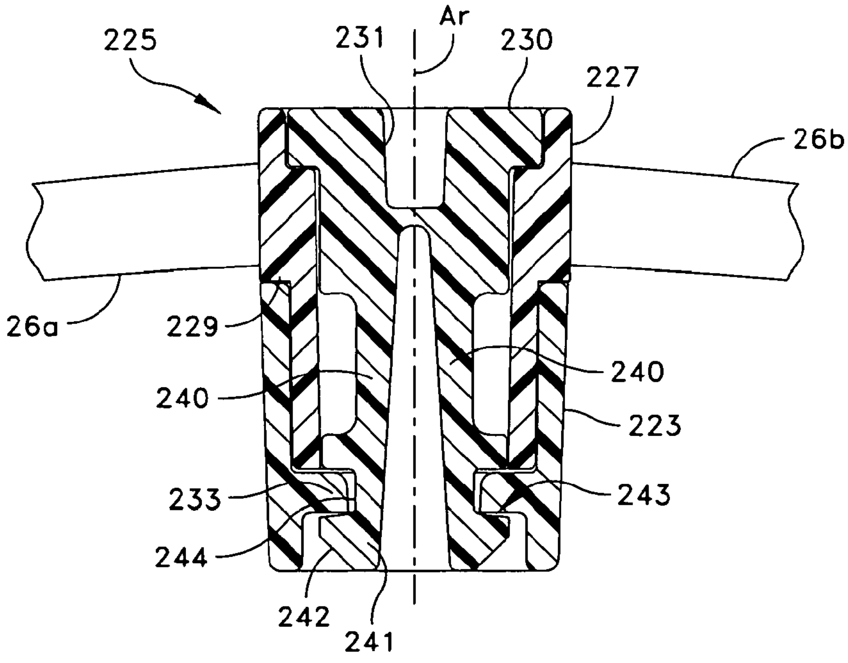
FIG. 11 is a cross sectional view of the articulating joint shown in FIG. 10, taken along plane 11-11.

Referring now particularly to FIGS. 7, 9, and 11, collar 223 may be generally cylindrical in shape; however, other suitable shapes are possible. Collar 223 includes an upper end 236, a lower end 237, and further defines an axial socket 221 configured to receive sleeve 227. In one embodiment, collar 223 may be formed on a terminal end of stationary spine 224. Socket 221 may extend completely through collar 223 as shown in FIG. 9 from upper end 236 of the collar to opposite lower end 237. Collar 223 may further define an annular ledge 233 disposed in socket 221 which defines a reduced diameter opening 234. Ledge 233 may engage and assist in supporting sleeve 227. In some embodiments, ledge 233 may be spaced inward from the lower end of collar 223 (as best shown in FIG. 9) to further define a receptacle 235 within socket 221 located below the ledge. Receptacle 235 preferably has a diameter larger than the diameter of reduced diameter opening 234.

Referring to FIGS. 7, 9, and 11, sleeve 227 may have a generally cylindrical shape in one embodiment and be disposed on movable spine 222. In one embodiment, sleeve 227 may be disposed on a terminal end of movable spine 222. Sleeve 227 is mutually dimensioned and configured with collar 223 so that at least a portion of the sleeve may be received in socket 221 to form a rotatable articulating joint 225. The exterior surface of sleeve 227 may include an annular step 229 configured and adapted to engage collar 223. Step 229 may both limit the insertion depth of sleeve 227 into collar 223 and serve to support sleeve 227 in collar 223. In one embodiment, sleeve 227 defines an axial opening 228 that preferably extends completely through the sleeve from upper end 238 to opposite lower end 239. As best shown in FIG. 9, sleeve 227 may further define an annular surface 232 disposed in opening 228.

Referring to FIGS. 7-12, arms **26*a* and 26*b*, which support the earpieces 202 of eyeglass frames 200, are preferably attached to or formed integral with movable spine 222 so that rotating spine 222 also articulates the arms in unison therewith. In one possible embodiment, arms 26*a* and 26*b* may be attached to or formed integral with sleeve 227 and extend outwards therefrom as best shown in FIG. 7. A lateral brace 226 may be provided extending between arms 26*a* and 26*b*** to further stabilize and support the arms.

Referring to FIGS. 7 and 11, pin 230 includes a pair of resilient prongs 240 for pivotably coupling sleeve 227 to collar 223. Prongs 240 are preferably spaced apart from each other in a normal undeflected condition. Pin 230 is configured and adapted to be received through opening 228 of sleeve 227 and engage collar 223 while permitting pivotable movement between the sleeve and collar, and concomitantly between movable spine 222 and stationary spine 224. Conceptually, prongs 240 function in a similar manner to flanges 24 disposed on cantilever beams 22 shown in FIG. 13 and described herein. Each prong 240 includes a flange 241 having a wedge-shaped ramp 242 and an engaging surface 243 adapted to engage ledge 233 of collar 223 as shown in FIGS. 7 and 11. In some embodiments, as shown in FIG. 11, prongs 240 may each define a groove 244 configured to receive at least a portion of annular ledge 233 of collar 223. In some embodiments, pin 230 may have a recess 231 disposed in a top surface of the pin that is configured to receive and mount a display card or price tag holder 102 shown in FIG. 7.

Collar 223, sleeve 227, and pin 230 may be made of similar materials to support frame 12, lock 16, and key 18 as already described herein such as a flexible and semi-rigid polymer in some embodiments. Preferably, at least pin 230 is made of a flexible material to provide elastically deformable prongs 240. In some embodiments, collar 223 and sleeve 227 are formed as integral parts of stationary spine 224 and movable spine 222, respectively. In other embodiments, collar 223 and sleeve 227 may be separate components attached to stationary spine 224 and movable spine 222, respectively, by any means conventionally used in the art.

Figure 12:
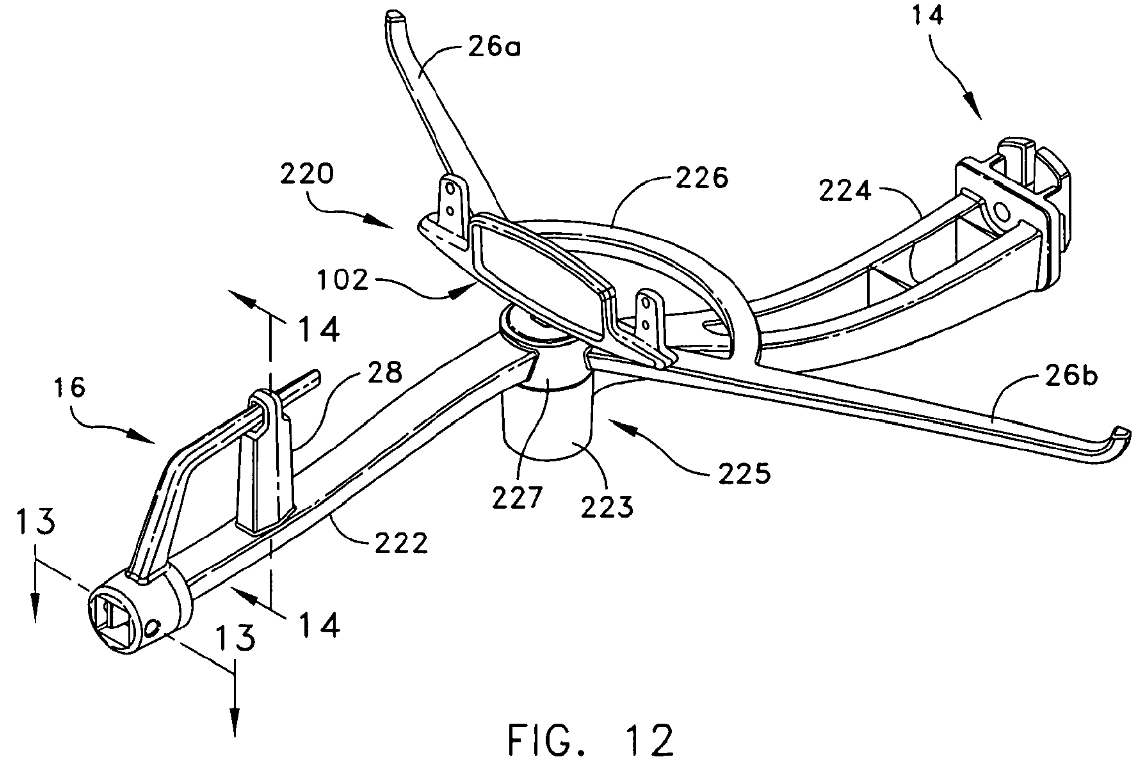
FIG. 12 is a perspective view of the fully assembled second embodiment of the display assembly shown with the lock installed.

Referring to FIGS. 7-12, articulating joint 225 may be assembled in the following manner either before or after stationary spine 224 is mounted to display object 120 via anchor 14. Sleeve 227 is first inserted into the top of collar 223 to form the assembly shown in FIGS. 8 and 9. Sleeve 227 engages ledge 233 of collar 223 and annular step 229 of the sleeve engages the upper end 236 of the collar. In other embodiments not shown, sleeve 227 may alternatively be shorter in height than that shown in FIG. 9 such that the sleeve will not contact or engage ledge 233 when annular step 229 engages collar 223. In either scenario, sleeve 227 is now in position to be rotatably secured or locked to collar 233. Pin 230 is next inserted through sleeve 227 to engage collar 223. Prongs 240 on pin 230 will be initially spaced apart in an undeflected condition before being inserted into sleeve 227. As prongs 240 advance through sleeve 227, ramps 242 on flanges 241 will first encounter and engage annular ledge 233 of collar 223 as the flanges enter the near side reduced diameter opening 233. This will cause prongs 240 to flex inward towards each other and be compressed together, thereby allowing the prongs to be further advanced into collar 223. Eventually, flanges 241 will emerge from the far side of reduced diameter opening 233. When the flanges 241 clear opening 233, prongs 240 will elastically spring back apart and outwards from each other to their initial undeflected conformation. Engaging surfaces 243 on flanges 241 will engage ledge 233 of collar 223 as shown in FIG. 11 to secure and lock pin 230, collar 223, and sleeve 227 together forming the completed articulating joint 225. Eyewear display assembly 10 will now generally appear as shown in FIG. 12 after lock 16 is secured to movable spine 222 or in FIG. 15 with a pair eyeglass frames 200 placed on assembly 10 before lock 16 is applied.

Although articulating support frame 220 is shown combined with lock 16 in the figures, it will be appreciated that in other embodiments the articulating support frame 220 may be provided without the locking feature. Accordingly, the invention is not limited to the combination of lock 16 with articulating support frame 220 alone.

Figure 16:
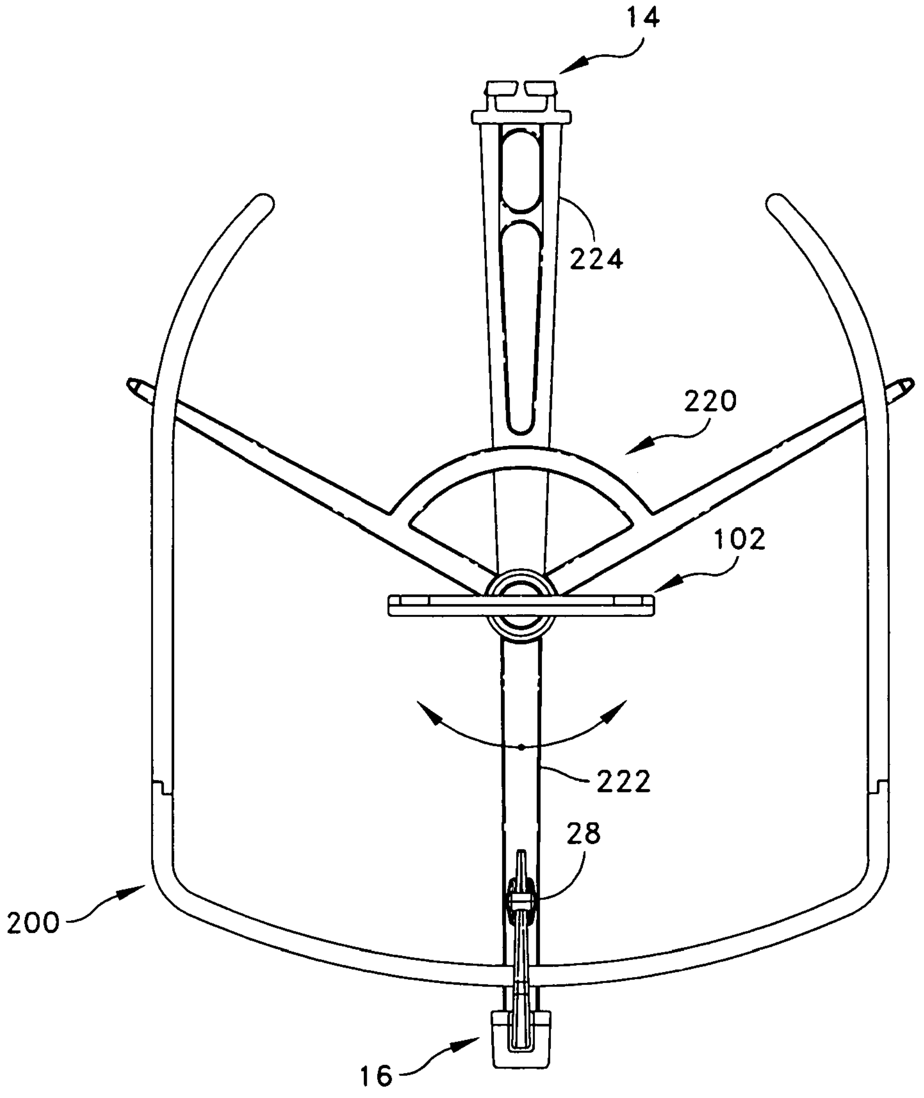
FIG. 16 is a top view of the second embodiment of the display assembly shown in a first position.
Figure 17:
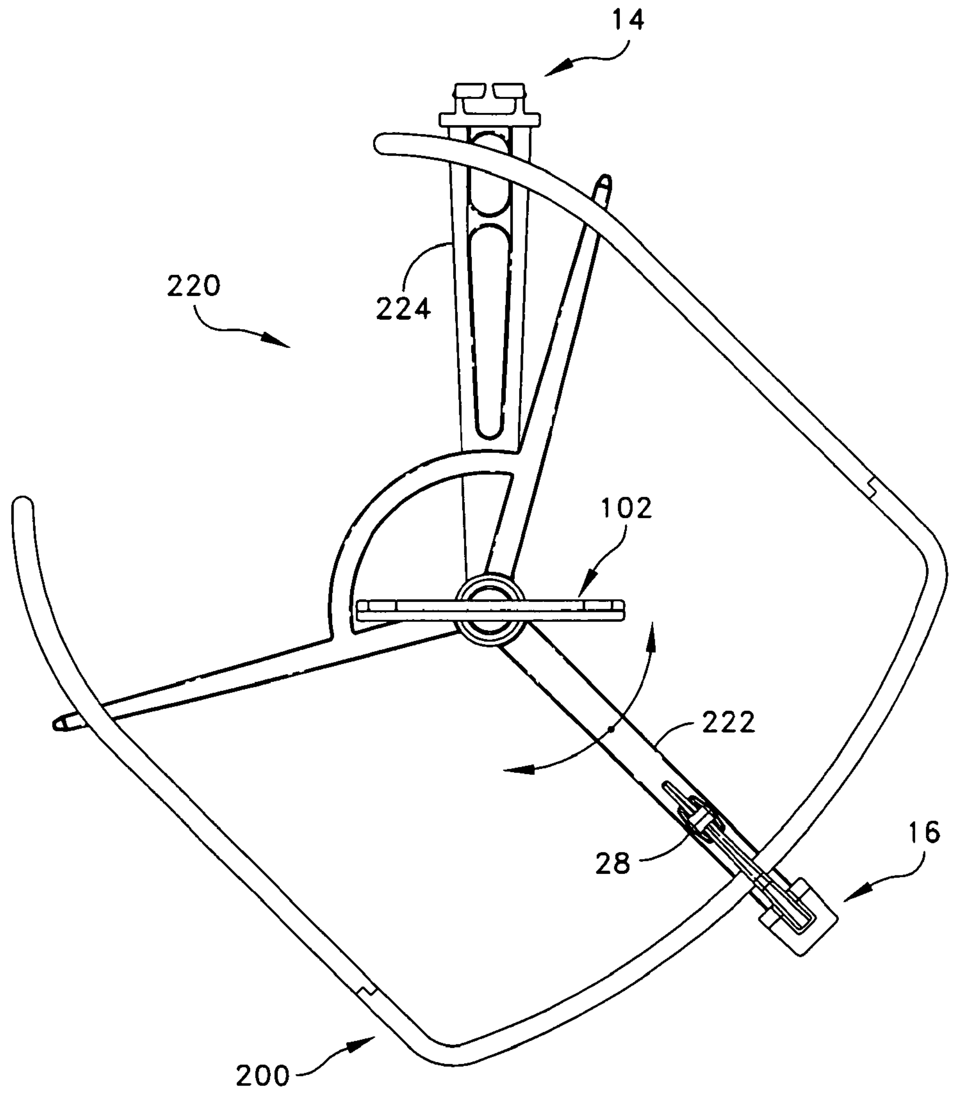
FIG. 17 is a top view of the second embodiment of the display assembly shown in an angled second position.
Figure 18:
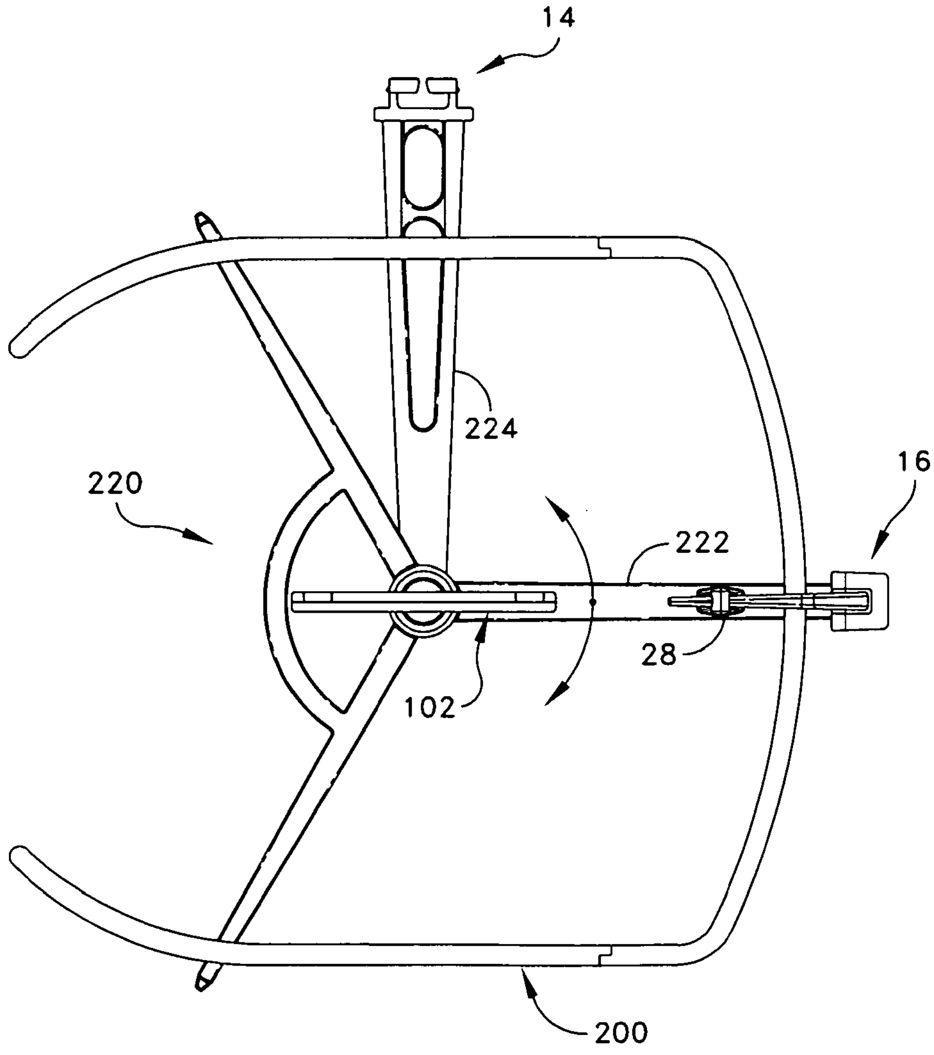
FIG. 18 is a top view of the second embodiment of the display assembly shown in an angled third position.

FIGS. 16-18 show articulating support frame 220 in various exemplary possible positions wherein movable spine 222 is selectively rotatable by a user with respect to stationary spine 224. FIG. 16 shows support frame 220 in a first fully forward position in which movable spine 222 is substantially aligned axially with stationary spine 224. In FIG. 17, movable spine 222 has been rotated laterally and angled approximately 45 degrees with respect to stationary spine 224 in a second possible position. FIG. 18 shows movable spine 222 rotated further laterally and angled approximately 90 degrees with respect to stationary spine 224 in a third possible position. Preferably, movable spine 222 may be rotated in either left or right lateral directions (as viewed in FIGS. 16-18) along a generally horizontal plane with respect to stationary spine 224. In a preferred embodiment, movable spine 222 is movable along a continuum of possible positions in either direction with respect to stationary spine 224. Accordingly, in this embodiment, it will be appreciated that movable spine 222 may be positioned at numerous possible positions with respect to stationary spine 224 between the exemplary positions shown in FIGS. 16-18 and beyond. In some embodiments, movable spine 222 may be completely rotated 360 degrees around articulating joint 225 so long as adequate clearance is provided to allow the mounted eyeglass frames 200, arms 26*a* and 26*b*, and movable spine 222 to be freely rotated without interfering with display object 120 (shown in FIG. 5).

Articulating support frame 220 advantageously allows unique temple or earpiece designs of eyeglass frames to be displays to consumers. Moreover, in some embodiments where articulating support frame 220 is combined with the lock 16 described herein, a consumer may rotate the eyeglass frames to inspect the front and sides while the eyeglass frames remain securely locked to support frame 220.

Figure 25:
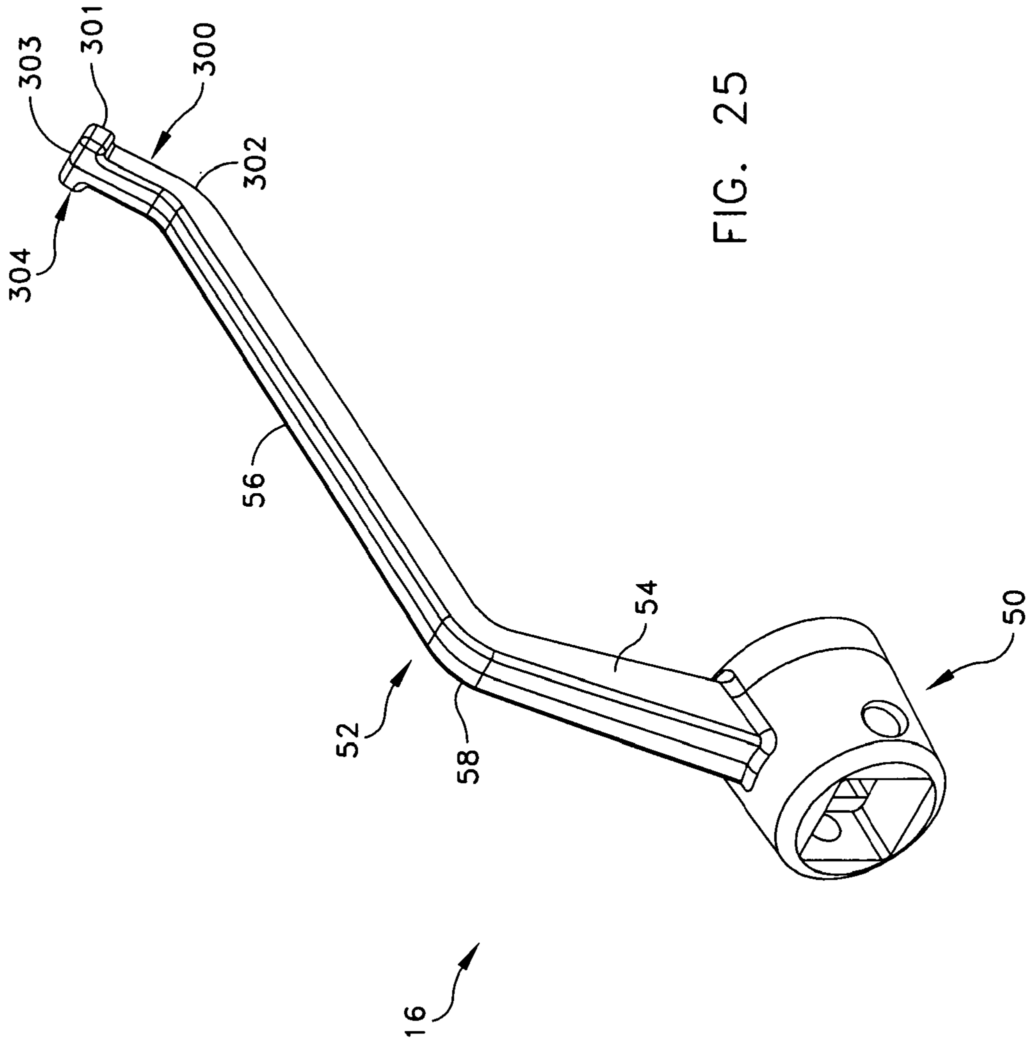
FIG. 25 is a front perspective view of a second embodiment of a lock of the display assembly.
Figure 26:
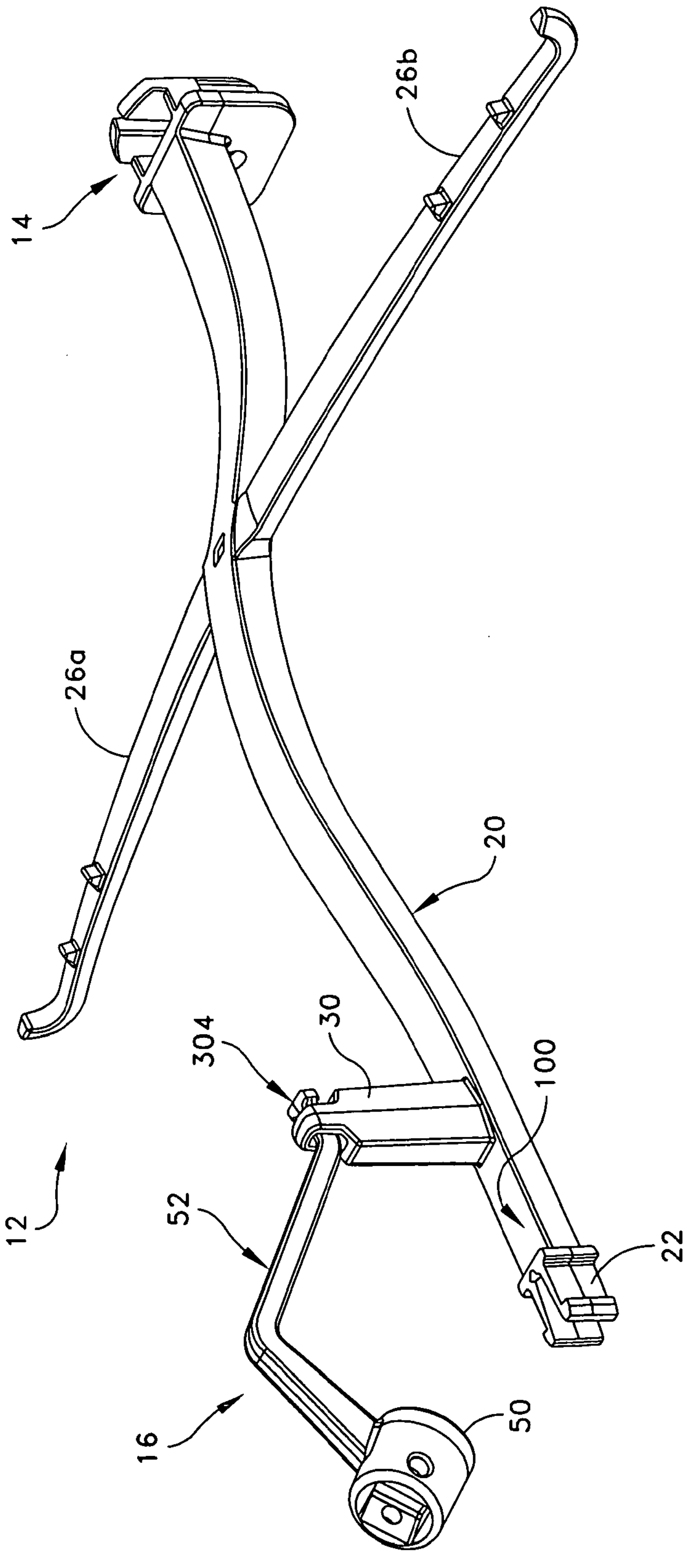
FIG. 26 is a front perspective view of the second embodiment of FIG. 25 in an open position attached on the display assembly.

FIG. 25 shows an alternative embodiment of a lock 16 which is configured to further secure the lock to spine 20 of display assembly 10. Barrel 50 is similar to that shown and described herein with respect to FIGS. 2 and 3 including the appurtenances and openings provided therein. Distal portion 56 of lockbar 52, however, is provided with an upward flared section 300 formed by an elbow 302 disposed near free end 303 of the lockbar. In a preferred embodiment, free end 303 includes a retaining member 304 that is configured and adapted to fit through opening 30 defined at the top end of tower 28 which is disposed on spine 20 (see, e.g. FIG. 1). In one possible embodiment, retaining member 304 is configured as a "T-shaped" section having opposing ends 301 that preferably extend laterally outwards farther than the sides of lockbar 52 near free end 303. T-shaped retaining member 304 is preferably sized in cooperation with opening 30 of tower 28 so that the retaining member will fit through the opening when oriented in at least one direction. For example, in some embodiments opening 30 may have a great height than width so that T-shaped retaining member 304 can readily be passed through the opening if the lockbar 52 is oriented 90 degrees sideways. After the T-shaped retaining member 301 passes through opening 30, lockbar 52 can be up-righted to the position shown in FIG. 26. The lockbar 52 is now secured through opening 30 in tower 28 so that the lockbar cannot be readily withdrawn from the tower when slid forwards towards cantilever beams 22 on spine 20. As shown in FIG. 26, opposing ends 301 of retaining member 304 will engage the tower 28 to advantageously prevent or at least hinder complete removal of lock 16 from spine 20 without undue force as an added measure of security if an unauthorized user attempts to withdraw the lockbar 52 from tower 28 with using the key 18 (see FIG. 4). When lock 16 is in this "open" position shown in FIG. 26, the eyeglasses and/or frame may be removed from spine 20 for viewing by a customer. Lock 16 may then be re-locked into a "closed" position similar to that shown in FIG. 12 (having alternatively a straight lockbar distal portion 56).

Referring to FIG. 26, elbow 302 of lockbar 52 in one embodiment is preferably configured and sized to create a snug friction fit between the lockbar and opening 30 in tower 28 when barrel 50 of the lock 16 is tilted upwards as shown. This allows the lockbar to be positioned and retained in the open position shown for convenience while a consumer is trying on eyewear.

Figure 27:
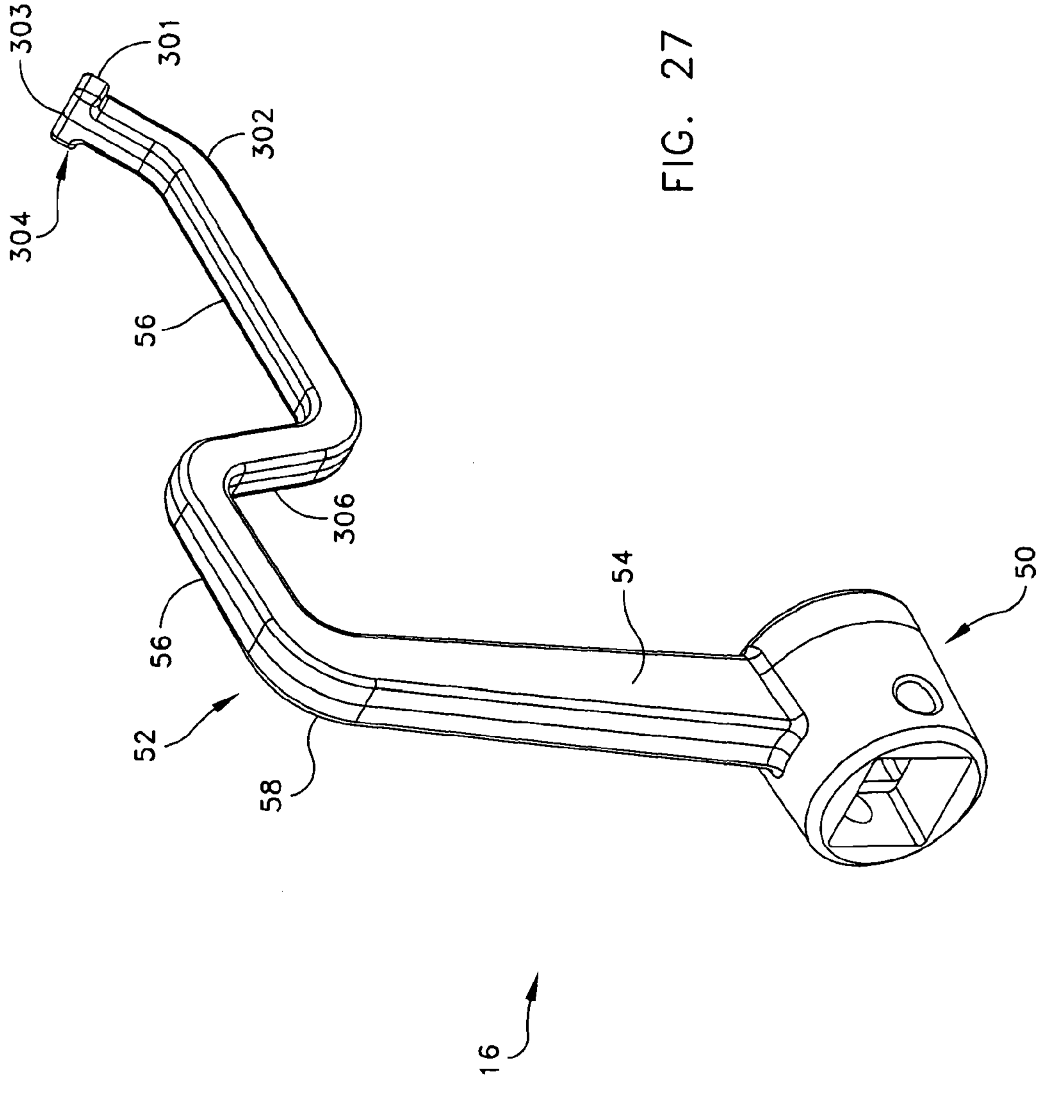
FIG. 27 is a front perspective view of a third embodiment of a lock of the display assembly.

FIG. 27 shows an alternative embodiment of a lock 16 with a lockbar 52 having a retaining member 304 that is essentially similar to that shown in FIGS. 25-26, with the exception that the lockbar contains a downward hook-shaped extension 306. This alternative design provided greater vertical clearance between lockbar 52 and horizontal supporting surface 100 of spine 20 on which the nose bridge 204 of the eyeglass frames 200 rests. This allows eyeglass frames having a taller or higher nose bridge 204 construction and/or ornamentation to be accommodated.

While the foregoing description and drawings represent the preferred embodiments of the present invention, it will be understood that various additions, modifications and substitutions may be made therein without departing from the spirit and scope of the present invention as defined in the accompanying claims. In particular, it will be clear to those skilled in the art that the present invention may be embodied in other specific forms, structures, arrangements, proportions, sizes, and with other elements, materials, and components, without departing from the spirit or essential characteristics thereof. One skilled in the art will appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

What is claimed is:

1. A lockable eyewear display system comprising:

an eyewear support frame attachable to a display object and defining a pair of resiliently movable locking members, wherein said support frame includes (i) an articulating joint allowing a first movable portion of the support frame to be rotated with respect to a second stationary portion of the support frame;

wherein the pair of resiliently movable locking members are located on a distal end portion of the first movable portion of the support frame;

and (ii) a complementary-shaped opening disposed in a top portion of a tower which extends upwards from the first movable portion of the support frame;

a lock removably attachable to the first movable portion of the support frame and the tower by a lockbar that is received through the complementary-shaped opening formed on the tower, wherein the locking members of the support frame engage complementary locking surfaces within the lock when the lock is attached to the support frame;

wherein, when in use, the lock and the support frame define a loop; a nose bridge of eyeglasses rests within the loop on an end portion of the first movable portion of the support frame and is confined by the lock bar so that the eyeglasses cannot be removed from the support frame when the lock is secured to the locking members and the tower;

and a key configured and operable to disengage the locking members from the lock to allow a user to remove the lock and the eyeglasses from the support frame.

2. The system of claim 1, wherein the locking surfaces are disposed on a pair of spaced-apart ridges disposed on the lock.

3. The system of claim 1, wherein the locking members are spaced-apart cantilever beams extending outwards from the support frame.

4. The system of claim 1, wherein the key includes a pair of spaced apart flexible cantilevers configured to disengage the locking members from the lock.

5. The system of claim 1, wherein the key includes a pair of user-movable opposing pegs cooperatively configured with eyeholes disposed through the lock to engage the locking members with the pegs when the lock is attached to the support frame.

6. The system of claim 1, wherein the support frame includes two arms extending outwards from a longitudinally-extending spine to support the eyewear.

7. The system of claim 1, wherein the lock comprises a cylindrical barrel defining an axial central passageway configured to at least partially receive the locking members therein.

8. The system of claim 1, wherein the joint includes a collar formed on stationary second portion, a sleeve formed on the movable first portion, and a pin received through the collar and sleeve to rotatably couple the first portion to the second portion.

9. A lockable eyewear display system comprising:

an eyewear support frame for holding an eyewear including a longitudinally-extending spine attachable to a display object, one end of the spine defining a pair of resiliently movable spaced-apart locking members each having a flange and wherein said support frame defines a joint allowing a first movable portion of the support frame to rotate with respect to a second stationary portion of the support frame and further including a complementary-shaped opening disposed in a tower extending outwards from the support frame;

a lock defining a central passageway for axially receiving at least a portion of the locking members therein, the lock having opposing ridges disposed in the central passageway and being configured to engage the flanges of the locking members such that the lock cannot be removed from the spine when the locking members are fully inserted in the lock; and a key defining a pair of resilient spaced-apart operating extensions movable inwards towards each other, the extensions each having a releasing protrusion positioned to engage the locking members when the key is abutted against the lock;

wherein when the key is abutted against the lock and an inward force is applied to the operating extensions of the key, the release protrusions engage and compress the locking members to allow a user to remove the lock and the eyewear from the spine.

10. A rotatable eyewear display assembly comprising:

a longitudinally-extending stationary spine having an anchor attachable to a display object;

a longitudinally-extending movable spine configured to support an eyeglass frame including a complementary-shaped opening disposed in a tower extending upwards from the movable spine of the support frame; and an articulating joint rotationally coupling the movable spine to the stationary spine, wherein the movable spine can be rotated in at least one direction with respect to the stationary spine; and wherein the movable spine includes a surface for supporting a nose bridge of the eyeglass frame and two outwardly extending arms for supporting earpieces of the eyeglass frame;

a lock removably attachable to the movable spine by a lockbar that is received through the complementary-shaped opening formed in the tower; the lock configured to form a closed loop with the movable spine for locking the eyeglass frames therein; wherein a distal end of the movable spine includes a pair of spaced-apart resilient cantilever beams operable to engage the lock when the lock is attached to the movable spine.

11. The assembly of claim 10, wherein the movable spine can be selectively swiveled by a user in at least two directions along a plane.

12. The assembly of claim 10, wherein the articulating joint is formed by the stationary spine including a collar configured to receive at least a portion of a complementary-shaped sleeve disposed on the movable spine, the sleeve being rotatable with respect to the collar when seated therein.

13. The assembly of claim 12, further comprising a pin received through the sleeve and collar to rotatably couple the movable spine to the stationary spine for articulating movement.

14. The assembly of claim 12, wherein the pin includes spaced-apart resilient prongs configured to lockingly engage the collar.

15. The assembly of claim 10, wherein the movable spine is movable from a fully forward position in which the movable spine is axially aligned with the stationary spine to a lateral position in which the movable spine is disposed at an angle to the stationary spine.

16. A rotatable eyewear display assembly comprising:

a longitudinally-extending stationary spine having an anchor attachable to a display object, the stationary spine including a collar defining a socket;

a longitudinally-extending movable spine configured to support an eyeglass frame, the movable spine including a sleeve having a portion rotatably received in the socket of the collar providing articulating movement of the movable spine with respect to the stationary spine; and a pin inserted through the sleeve and collar to rotatably couple the movable spine to the stationary spine, the pin including a pair of spaced-apart resilient prongs engaging a ledge formed in the socket of the collar for locking the pin in the collar and sleeve; and a lock axially attachable to an end of the movable spine, the lock including a curved lockbar insertable through a complementary-shaped opening formed in a tower extending upwards from the movable spine so as to form a closed loop for locking eyeglass frames therein when the lock is attached to the movable spine, wherein the movable spine includes a pair of spaced-apart resilient cantilever beams having flanges operably engaged with corresponding locking surfaces disposed in a central passageway extending through the lock such that the lock cannot be removed from the movable spine, and a key comprising a pair of spaced apart flexible cantilevers configured to disengage the lock.

17. The assembly of claim 16 further comprising a key having resilient spaced-apart movable operating extensions arranged in opposing relationship to each other and being movable by a user to disengage the flanges from the locking surfaces of the lock.

18. The assembly of claim 16, wherein the anchor includes a mounting plate and a pair of spaced-apart resilient tabs each coupled to the plate by a respective side panel, the tabs and panels being expandable to engage the sides of a portal formed in a display object when the tabs and panels are seated therein.

19. The assembly of claim 16 further comprising a retaining member disposed on one end of the lockbar.

20. The assembly of claim 19, wherein the retaining member is a T-shaped section.

21. The assembly of claim 16 wherein the lockbar includes a downward hook-shaped extension.

22. A lockable eyewear display system comprising:

an eyewear support frame attachable to a display object and defining a pair of resiliently movable locking members, wherein the support frame includes an articulating joint allowing a first movable portion of the support frame to be rotated with respect to a second stationary portion of the support frame, and wherein the joint includes a collar formed on stationary second portion, a sleeve formed on the movable first portion, and a pin received through the collar and sleeve to rotatably couple the first portion to the second portion;

a lock removably attachable to the first movable portion of the support frame, the lock including a curved lockbar insertable through a complementary-shaped opening formed in a tower extending upwards from the movable spine so as to form a closed loop for locking eyeglass frames therein when the lock is attached to the first movable portion, the locking members of the support frame engaging complementary locking surfaces within the lock when the lock is attached to the first movable portion of the support frame; and a key comprising a pair of spaced apart flexible cantilevers configured and operable to disengage the locking members from the lock to allow a user to remove the lock from the support frame.

23. A lockable eyewear display system comprising:

an eyewear support frame for holding eyewear; the support frame being attachable to a display object and defining a pair of resiliently movable locking members comprising spaced-apart cantilever beams extend outwardly from the support frame, wherein said support frame includes (i) an articulating joint allowing a first movable portion of the support frame to be rotated with respect to a second stationary portion of the support frame and (ii) a complementary-shaped opening;

a lock removably attachable to the support frame by a lockbar that is received through a complementary-shaped opening formed on the support frame, the locking members of the support frame engaging complementary locking surfaces on the lock when the lock is attached to the support frame; and a key defining a pair of resilient spaced-apart operating extensions movable inwards towards each other, the extensions each having a releasing protrusion positioned to engage the locking members when the key is abutted against the lock;

wherein when the key is abutted against the lock and an inward force is applied to the operating extensions of the key, the release protrusions engage and compress the locking members to allow a user to remove the lock and the eyewear from the spine.

24. A lockable eyewear display system comprising:

an eyewear support frame for holding eyewear; the eyewear support being attachable to a display object and defining a pair of resiliently movable locking members comprising spaced-apart cantilever beams extend outwardly from the support frame, wherein said support frame includes (i) an articulating joint allowing a first movable portion of the support frame to be rotated with respect to a second stationary portion of the support frame and (ii) a complementary-shaped opening;

a lock removably attachable to the first movable portion of the support frame, the lock including a curved lockbar insertable through a complementary-shaped opening formed in a tower extending upwards from the movable spine so as to form a closed loop for locking the eyewear therein when the lock is attached to the movable spine, the locking members of the support frame engaging complementary locking surfaces on the lock when the lock is attached to the support frame; and a key including a pair of spaced apart flexible cantilevers configured and operable to disengage the locking members from the lock to allow a user to remove the lock and the eyewear from the support frame.

* * * * *